United States Patent
Abrahams et al.

(10) Patent No.: US 10,472,146 B2
(45) Date of Patent: Nov. 12, 2019

(54) KEY-RELEASABLE SECURING DEVICE

(71) Applicant: PLUS 8 INDUSTRIES LIMITED, Leamington Spa Warwickshire (GB)

(72) Inventors: John William Abrahams, Leamington Spa (GB); Benjamin Thomas Smith, Leamington Spa (GB)

(73) Assignee: PLUS 8 INDUSTRIES LIMITED, Leamington Spa Warwickshire (GB)

( * ) Notice: Subject to any disclaimer, the term of this patent is extended or adjusted under 35 U.S.C. 154(b) by 0 days.

(21) Appl. No.: 16/328,109

(22) PCT Filed: Aug. 29, 2017

(86) PCT No.: PCT/GB2017/052526
§ 371 (c)(1),
(2) Date: Feb. 25, 2019

(87) PCT Pub. No.: WO2018/042170
PCT Pub. Date: Mar. 8, 2018

(65) Prior Publication Data
US 2019/0185234 A1      Jun. 20, 2019

(30) Foreign Application Priority Data

Aug. 30, 2016   (GB) .................................. 1614678.9

(51) Int. Cl.
*B65D 63/10*       (2006.01)
(52) U.S. Cl.
CPC ....... *B65D 63/1081* (2013.01); *Y02W 30/807* (2015.05); *Y10T 24/1498* (2015.01)
(58) Field of Classification Search
CPC ............. B65D 63/1081; Y02W 30/807; Y10T 24/141; Y10T 24/1498
See application file for complete search history.

(56) References Cited

U.S. PATENT DOCUMENTS

| | | | | |
|---|---|---|---|---|
| 1,462,238 A | * | 7/1923 | Mennillo | E05B 67/003 70/15 |
| 3,542,321 A | * | 11/1970 | Kahabka | F16L 3/233 248/205.3 |

(Continued)

FOREIGN PATENT DOCUMENTS

WO       9713946 A1     4/1997

OTHER PUBLICATIONS

International Preliminary Examining Authority Report on Patentability dated Sep. 7, 2018 for International application PCT/GB2017/052526, 13 pages.

*Primary Examiner* — Robert Sandy
*Assistant Examiner* — Rowland Do
(74) *Attorney, Agent, or Firm* — Smith IP Services, P.C.

(57) ABSTRACT

A key-releasable securing device has a flexible strap having a plurality of teeth and a locking head. The locking head has a cavity in which the flexible strap is insertable into and through to form a securing loop of adjustable dimension. The flexible strap is slidably movable in first or second directions to reduce or increase, respectively, the dimension of the securing loop. A pawl member is located inside the locking head so as to engage with the teeth of the flexible strap to allow movement in the first direction but prevent movement in the second direction. As a release key is inserted into the locking head, the release key is guided by guide means into engagement with the pawl member, so as to move the pawl member out of engagement with the teeth of the flexible strap to allow the strap to move in the second direction.

11 Claims, 15 Drawing Sheets

(56) References Cited

U.S. PATENT DOCUMENTS

| | | | | |
|---|---|---|---|---|
| 4,008,512 | A | * | 2/1977 | Prodel .................... F16L 3/2334 |
| | | | | 24/16 PB |
| 4,287,731 | A | * | 9/1981 | Kruger .................... E05B 75/00 |
| | | | | 70/16 |
| 5,224,244 | A | * | 7/1993 | Ikeda ...................... F16L 3/233 |
| | | | | 24/16 PB |
| 5,377,510 | A | | 1/1995 | Smith |
| 6,185,791 | B1 | * | 2/2001 | Khokhar ............ B65D 63/1063 |
| | | | | 24/16 PB |
| 6,446,474 | B1 | * | 9/2002 | Tabacchi ............ B65D 63/1027 |
| | | | | 128/869 |
| 2010/0011542 | A1 | * | 1/2010 | Badrenas Buscart ........................ |
| | | | | A44B 11/266 |
| | | | | 24/163 R |
| 2014/0165339 | A1 | | 6/2014 | Yuan |

* cited by examiner

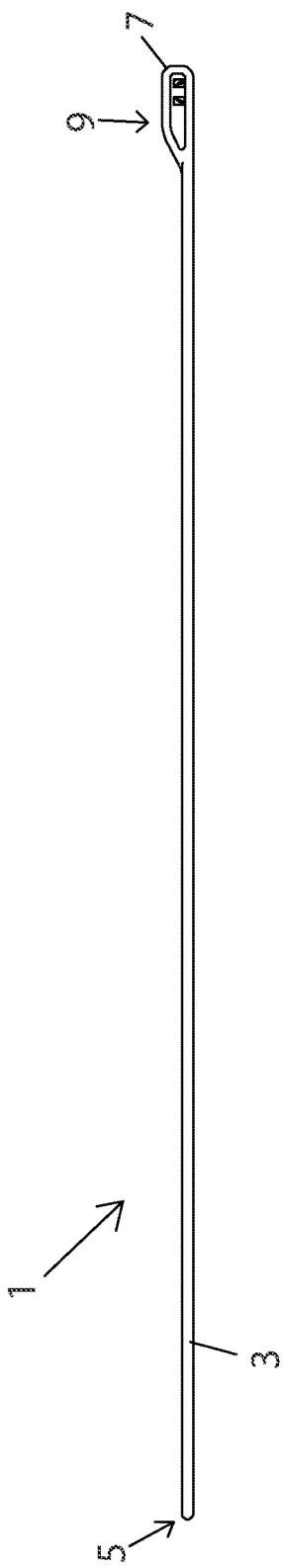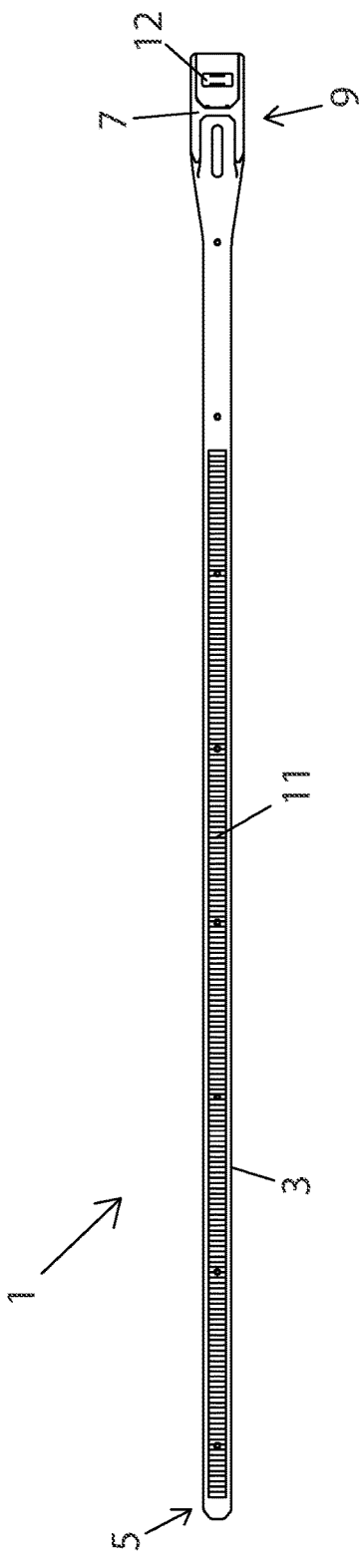
FIG. 1A
FIG. 1B

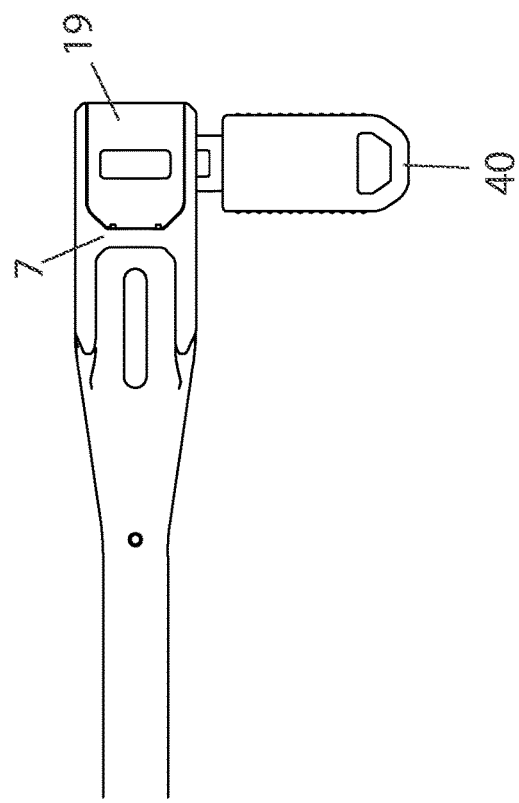
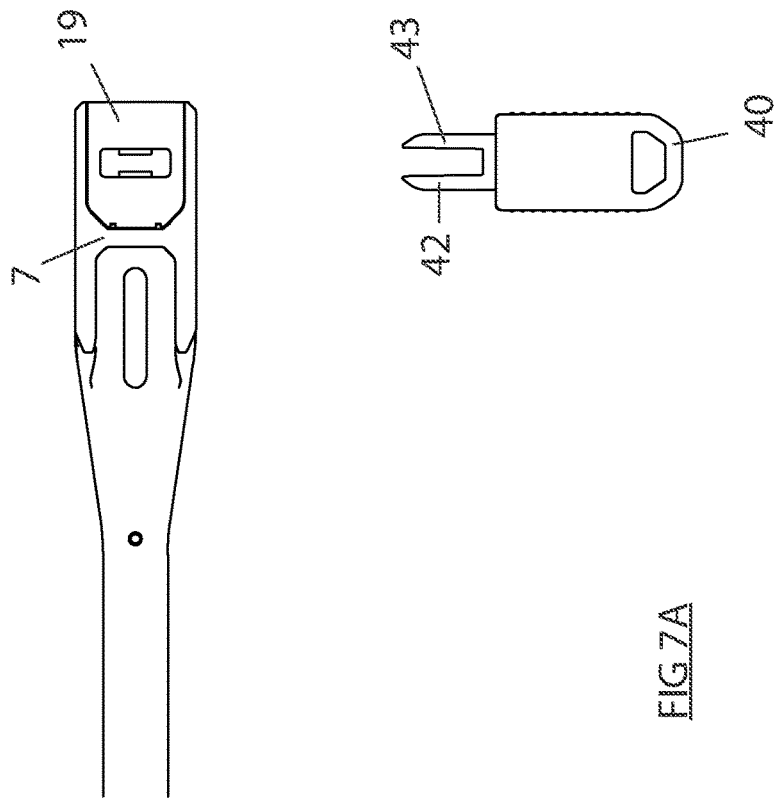
FIG 7A
FIG 7B

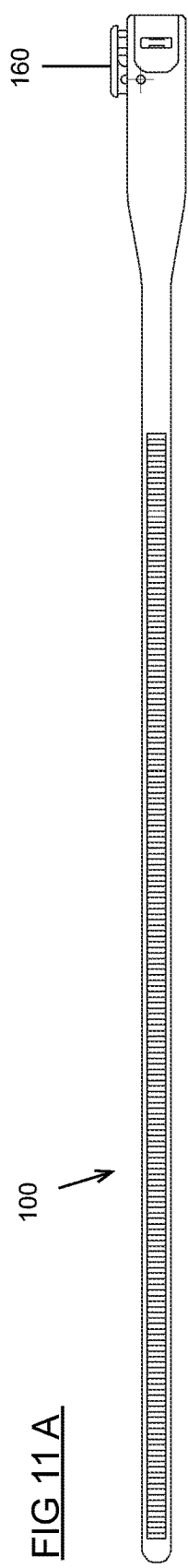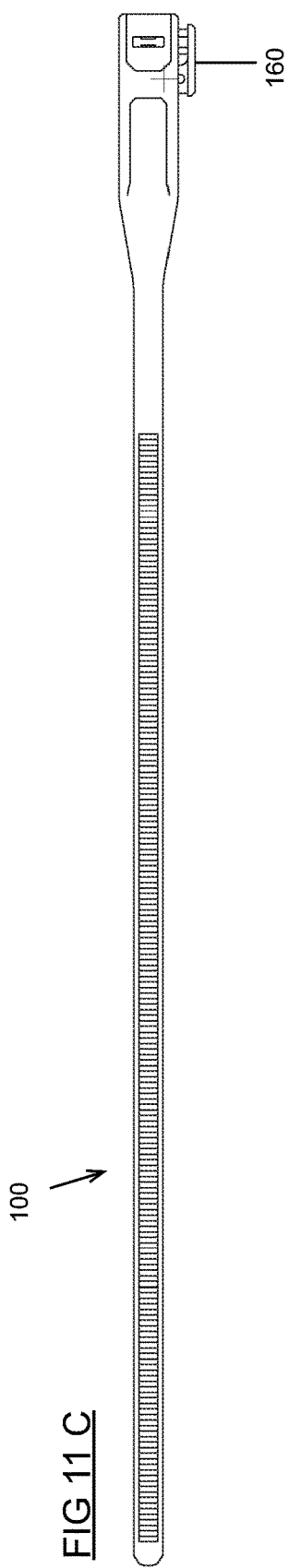

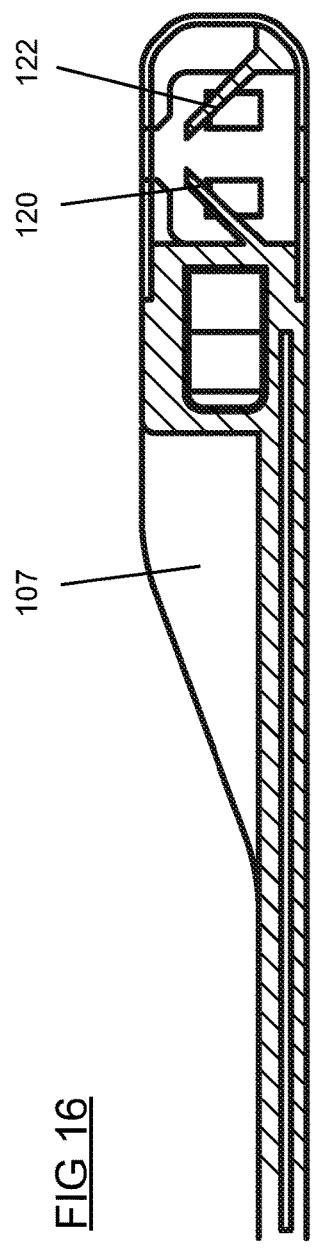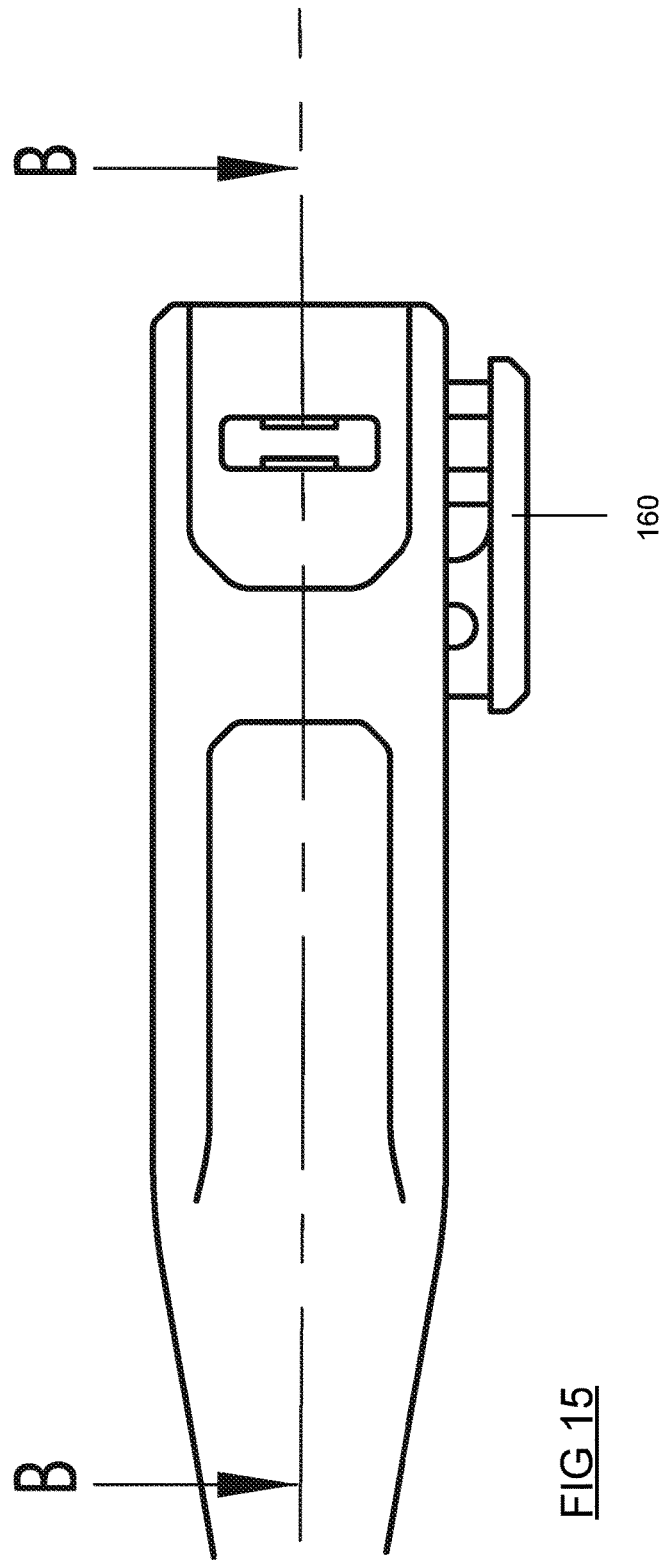

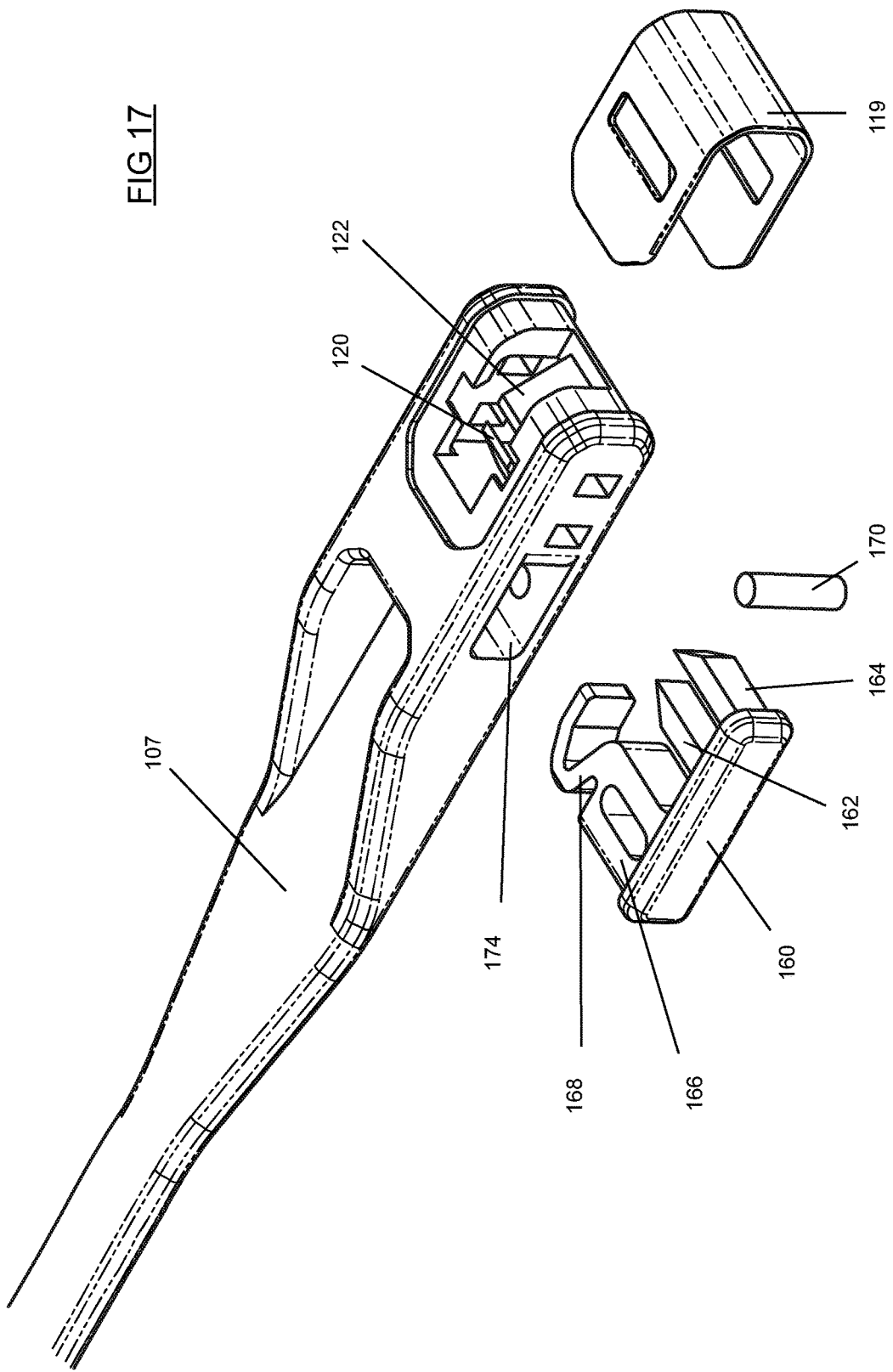

KEY-RELEASABLE SECURING DEVICE

CROSS-REFERENCE TO RELATED APPLICATION

This application is a national stage under 35 USC 371 of International Application No. PCT/GB2017/052526, filed on 29 Aug. 2017. The entire disclosure of this prior application is incorporated herein by this reference.

The present invention relates to a securing device that may be used to secure objects which is releasable with a key. Specifically, the present invention relates broadly to the type of securing devices commonly known as "cable ties."

Cable ties are useful as a temporary restraint or to provide temporary security for people or objects. For example, many cable ties are used to bind objects together in a bundle, for example a bundle of cables that can then be safely stored or positioned out of the way as a bundle and not separately (where they may pose a safety hazard). Cable ties can accommodate objects of varying sizes since they are adjustable.

Traditionally cable ties comprise a flexible strap which can be inserted into a locking head to form a closed loop. A ratchet mechanism in the locking head engages with one or more teeth on the strap, so that movement of the strap in a direction that decreases the dimension of the loop is permitted but movement of the strap in the opposite direction, in which the dimension of the loop is increased, is prevented.

In particular, when the strap is placed around an object and looped back on itself and through the locking head to form the closed loop the strap may be maximally tightened (in which the interior dimension of the loop is substantially similar to the exterior dimension of the object that it is placed around). This 'tightened condition' is maintained due to the ratchet arrangement inside the locking head which prevents the loop being loosened.

However, this means that such devices can only be used a single time. In order to release a cable (or other article) secured within the device it is usually necessary to cut the cable tie from the object. When the other article is a person's wrist this can pose serious risk or injury, and in any event an undue risk of injury will always be present when a knife or other sharp object is used to cut the cable tie.

Additionally, the fact that the cable tie can be effectively destroyed using only a pair of scissors means that known cable ties do not readily lend themselves for securely restraining articles.

U.S. Pat. No. 5,377,510 discloses a key-releasable restraint. The restraint includes a strap with a ratcheting lock at a free end of the strap. The strap is insertable into the lock to form a closed loop. The lock of U.S. Pat. No. 5,377,510 includes a ratchet body with a set of ratchet pawls positioned within an internal cavity. The set of ratchet pawls engages teeth on the strap; and several pawls can engage several teeth at once. The restraint of U.S. Pat. No. 5,377,510 is releasable with a key. The key includes a barrel and a tab which is received within a keyhole and keyslot, respectively, in the lock; and a pin extends through and is coaxial with the keyhole, the pin being received by a hole in the barrel of the key when the key is inserted into the keyhole. In order to release the locking engagement between the pawls and the teeth the key is inserted into the lock and then rotated counter-clockwise to urge the ratchet body counter-clockwise and upward so that the pawls disengage the teeth.

However, being reliant on rotation the key is only able to apply a limited force to the pawls. The key is also subjected to torque that could cause the key to bend or otherwise distort, or even break; since the component of the key that imparts the force to the pawl to move it out of engagement with the teeth is a tab at the end of the key. Also, two actions are required, the first being insertion of the key and the second being rotation of the key once the key has been correctly inserted.

The present invention attempts to improve upon such devices to address the above problems.

According to the present invention there is provided a key-releasable securing device comprising a flexible strap having a plurality of teeth; a locking head having a cavity, wherein the flexible strap is insertable into and through the cavity to thereby form a securing loop of adjustable dimension, the flexible strap being slidably movable within the cavity in a first direction to reduce the dimension of the securing loop, and slidably movable within the cavity in a second direction to increase the dimension of the securing loop; a pawl member located inside the locking head so as to engage with the teeth of the flexible strap when the flexible strap is inserted into the cavity, wherein engagement between the pawl member and the teeth permits movement of the strap in the first direction but prevents movement of the strap in the second direction; wherein the locking head comprises guide means; such that, as a release key is inserted into the locking head, the release key is guided by the guide means into engagement with the pawl, so as to move the pawl out of engagement with the teeth of the flexible strap to allow the strap to move in the second direction.

The pawl members may be biased into engagement with the teeth.

The guide means may be provided in a side wall of the locking device, and may be provided in either side of the locking device. This has the advantage that the means may be placed so as not to interfere with any locking mechanism inside the locking device, and that it does not matter which way the user orients the device to release it.

The guide means may prevent twisting of the key when the key is inserted into the locking head.

The guide means may be an opening in the locking head for receipt of the release key. This allows the device to by unlocked by simple insertion of a release key into the locking head.

The pawl member may be connected to the locking head at a point of flexure, such that the pawl member is capable of pivotable movement about the point of flexure. This allows the pawl member to hingedly move or pivot out of engagement with the teeth of the strap to allow withdrawal of the strap from the locking head.

The pawl member may comprise a locking tab for engaging a space between the teeth of the strap.

The teeth may be provided on either side of the strap, and the device may further comprise an additional pawl member, such that the pawl member and the additional pawl member engage the plurality of teeth in each side of the strap.

The strap may comprise a reinforcement which may comprise metal. This has the advantage that anyone wanting to steal an article secured within the device (when the device is locked) must be able to cut through the reinforcement. The device may further comprise a cap securable to the locking head to thereby restrict access to the interior of the locking head, and the cap may comprise metal. This also reduces the risk of tampering by a third party since it is harder to break into the locking head to gain access to the locking mechanism.

The locking head may be integral with the strap, and the device may be formed by moulding.

All or part of the device may comprise Nylon. The advantage of using Nylons is that the required flexibility in the strap, in particular, can be achieved whilst not compromising stability and rigidity.

According to the invention, there is also provided a system for releasable securing an article, the system comprising a key-releasable securing device and a key for releasing the securing device; the securing device comprising a flexible strap having a plurality of teeth; a locking head having a cavity, wherein the flexible strap is insertable into and through the cavity to thereby form a securing loop of adjustable dimension, the flexible strap being slidably movable within the cavity in a first direction to reduce the dimension of the securing loop, and slidably movable within the cavity in a second direction to increase the dimension of the securing loop; a pawl member located inside the locking head so as to engage with the teeth of the flexible strap when the flexible strap is inserted into the cavity, wherein engagement between the pawl member and the teeth permits movement of the strap in the first direction but prevents movement of the strap in the second direction; wherein the locking head comprises guide means; such that, as the release key is inserted into the locking head, the release key is guided by the guide means into engagement with the pawl, so as to move the pawl out of engagement with the teeth of the flexible strap to allow the strap to move in the second direction.

The invention is such that the action of inserting the key into the locking head results in the key firstly engaging (or abutting) the pawl member and then secondly, upon further insertion of the key, results in the continued engagement causing the key to press the pawl member out of engagement with the teeth of the flexible strap to allow the strap to move in aforementioned second direction. So, a single action of progressive insertion of the key into the locking head results in the strap becoming released from the locking head. The shape and size of the key relative to that of the guiding means is such that the key is constrained by the guiding means to move along only one available path as it is inserted into the locking head. The user may therefore merely apply a force to the key in a general direction which results in the key being inserted into the locking head. The guiding means controls the movement of the key resulting from the force applied by the user, and ensures that the key follows the predetermined path which results in the above described engaging of key with the pawl member and disengaging of the pawl member with teeth.

Reference herein to the key engaging the pawl member should be understood to include an arrangement wherein the key and pawl member are mechanically connected to one another by one or more other interconnecting elements (not shown in the drawings). For example, the key may press against one interconnecting element, which element presses against the pawl member, the key and pawl member not being in direct contact or abutment with one another.

The key may comprise a taper for urging the pawl members out of engagement with the teeth of the strap by a camming action/movement. The key may be shaped such that movement of the key into the locking device causes the pawl member to pivot out of engagement with the teeth of the strap.

The locking head may comprise an opening for receipt of the key. The guide means may be at least one opening in the locking head for receipt of the key. The cross section of the at least one opening may be substantially the same as the cross section of part of the key. The at least one prong may engage with the pawl member to move it out of engagement with the teeth of the strap.

The key may comprise at least one prong, and the prong may engage with the pawl member to move it out of engagement with the teeth of the strap. The cross section of one of prongs may be substantially the same as the cross section of one of the openings.

The guide means may be an opening that is dimensioned to receive the prong of the key. However, the guide means may also be an internal feature of the locking head, for example, an internal feature of the pawl member. For example, the guide means may be a taper on the pawl member, e.g. on an internal-facing side of the pawl member, or may be an internal taper on a wall of the locking head.

Maximal insertion of the key into the locking head completely disengages the ratchet-like engagement between the pawl members and the teeth and therefore maximally facilitates removal of the strap. Similarly, minimal movement of the key into the locking head may move the pawl members out of engagement with the teeth slightly, but possibly not enough for an easy withdrawal of the strap. In this way, a progressive insertion of the release key into the locking head moves the pawl members out of engagement with the teeth, thereby progressively facilitating withdrawal of the strap from the locking head.

The key may have two prongs and the locking head may have two openings (guide means) that prevent axial movement of the prongs of the key when the key is inserted into the locking head.

Advantageously, the guide means are configured to prevent any movement of the key other than axial movement. The guide means may be one or more openings to receive the key, and may be provided in either side of the locking head.

According to a second aspect of the invention there is provided a releasable securing device comprising a flexible strap having a plurality of teeth; a locking head having a cavity, wherein the flexible strap is insertable into and through the cavity to thereby form a securing loop of adjustable dimension, the flexible strap being slidably movable within the cavity in a first direction to reduce the dimension of the securing loop, and slidably movable within the cavity in a second direction to increase the dimension of the securing loop; a pawl member located inside the locking head so as to engage with the teeth of the flexible strap when the flexible strap is inserted into the cavity, wherein engagement between the pawl member and the teeth permits movement of the strap in the first direction but prevents movement of the strap in the second direction; wherein the locking head comprises guide means; such that as a release mechanism is actuated, the release mechanism is guided by the guide means into engagement with the pawl member, so as to move the pawl member out of engagement with the teeth of the flexible strap to allow the strap to move in the second direction.

Actuation of the release mechanism can be any suitable motion or movement that causes the pawls to disengage from the teeth of the strap. As will be described below, exemplary actuation is movement of a release mechanism into or further into the locking head of the device.

The guide means may comprise part of a side wall of the locking device; and may comprise at least one opening in the locking head for receipt of the release mechanism. The release mechanism may comprise at least one prong. The guide means may comprise at least one opening in the locking head for receipt of the release mechanism, wherein the release mechanism comprises at least one prong, and wherein the cross section of the at least one prong is substantially the same as the cross section of the at least one opening. In this way the prong is guided by the guide means (opening) into engagement with the pawl member so as to move the paw member out of engagement, facilitating 'removal' of the strap. The opening is therefore positioned such that it acts as a suitable guide means; i.e. it is positioned such that a release mechanism is necessarily guided into engagement with the pawl that urges the pawl out of engagement with the teeth. This will be described in further detail below.

The at least one prong may comprise a taper for urging the pawl member out of engagement with the teeth of the strap. The taper may be a 'horizontal' taper or a 'vertical' taper or a combination of both. The taper facilitates movement of the pawl members as the prong is guided into engagement with the pawl members, since the tapers provide a camming action that urge the pawl members away from the teeth of the flexible strap (out of engagement).

The guide means may comprise at least one opening in the locking head and the release mechanism comprises at least one prong, and the at least one prong is partially inserted in the at least one opening.

The release mechanism may be provided on a button, and wherein the release mechanism is partially inserted into the locking head. Two buttons may also be provided, each partially inserted into the locking head from either side. A pincer-like motion from a user's thumb and forefinger (or similar) can then apply gentle pressure on each button, releasing the prongs from the pawls—in the case that two buttons are provided two prongs may be provided on each button. Only two pawls may be inside the locking head and therefore the pawl members may each be 'secured' by two prongs (of the two buttons).

The button optionally further comprises a spring, where the spring biases the button outwardly from the locking head. This biases the button in a position in which the device may be considered 'locked' or 'secured'. I.e. the button is biased in a position where the prongs are not in a position that urges the pawls away from the strap. In this position puling the strap, or other movement of the strap, is prohibited by the engagement of the pawl members with the spaces between the teeth. Overcoming the bias places the button in a position in which the device may be considered 'unlocked' or 'releasable' etc. I.e. the button is pushed (overcoming the spring bias) into a position in which the prongs of the button are engaged with the pawls to urge them outwardly from the teeth of the strap; the device may therefore be loosened or unlocked as the strap is permitted to be pulled out of the locking head.

The pawl member may be resiliently biased into engagement with the strap.

The pawl member may comprise a locking tab for engaging a space between the teeth of the strap.

The plurality of teeth may be provided on both sides of the strap.

The releasable securing device may further comprise an additional pawl member, such that the pawl member engages teeth in one side of the strap and the additional pawl member engages teeth in the other side of the strap.

Herein, by insertion into the locking head it is meant insertion from outside the locking head into the locking head but also further insertion into the locking head (since the key may be provided partially inserted in the locking head; insertion in this case is intended to encompass further movement into the locking head).

The pawls could comprise metal.

A locking mechanism could be provided to lock the release mechanism or key into place, and thereby prevent movement of the key/actuation of the release mechanism that disengages the pawls from the teeth of the strap. The locking mechanism thereby locks the securing device into place since it prevents the withdrawal/loosening mechanism. One example of a locking mechanism could be a combination lock.

In exemplary embodiments the guide means are openings. However the guide means are any means capable of disengaging the pawl members.

In the first embodiment the key comprises a prong and the key is external to the locking head. However, the key may be attached to the locking head in such a way that the prong is outside the locking head. For example, the key is attached to the device via a tether or cord etc. The key can also be attached to the device in such a way that the prong is partially inserted into the locking head.

A prong may be attached to a button and the button may be provided in the device. The button may not be attached and may be completely external to the locking head (i.e. a separate component). The button may be attached such that the prong is outside the locking head (i.e. no part of the prong is inside the locking head even though the button is attached).

A pin may hold the button in the locking head. The pin may be integrally moulded with the locking head and the button incorporated at the manufacturing stage. Alternatively a hole in the bottom of the locking head may be provided for insertion of the pin and the device may be more readily assembled/disassembled than if it were moulded as a substantially single piece. Alternatively, it may be moulded as a substantially single piece.

A better understanding of the present invention will obtained from the following detailed description of a preferred embodiment. The description is given by way of example only and makes reference to the accompanying drawings in which:

FIG. 1A is a side view of a key-releasable securing device according to the present invention;

FIG. 1B is a top view of the device of FIG. 1A;

FIG. 7A is a top view of the device of FIG. 6;

FIG. 7B is a top view of the device of FIG. 7A in which the release key is inserted into the locking head;

FIGS. 11A, 11B and 11C are bottom, side and top views, respectively, of the device of FIG. 10;

Figure 10:
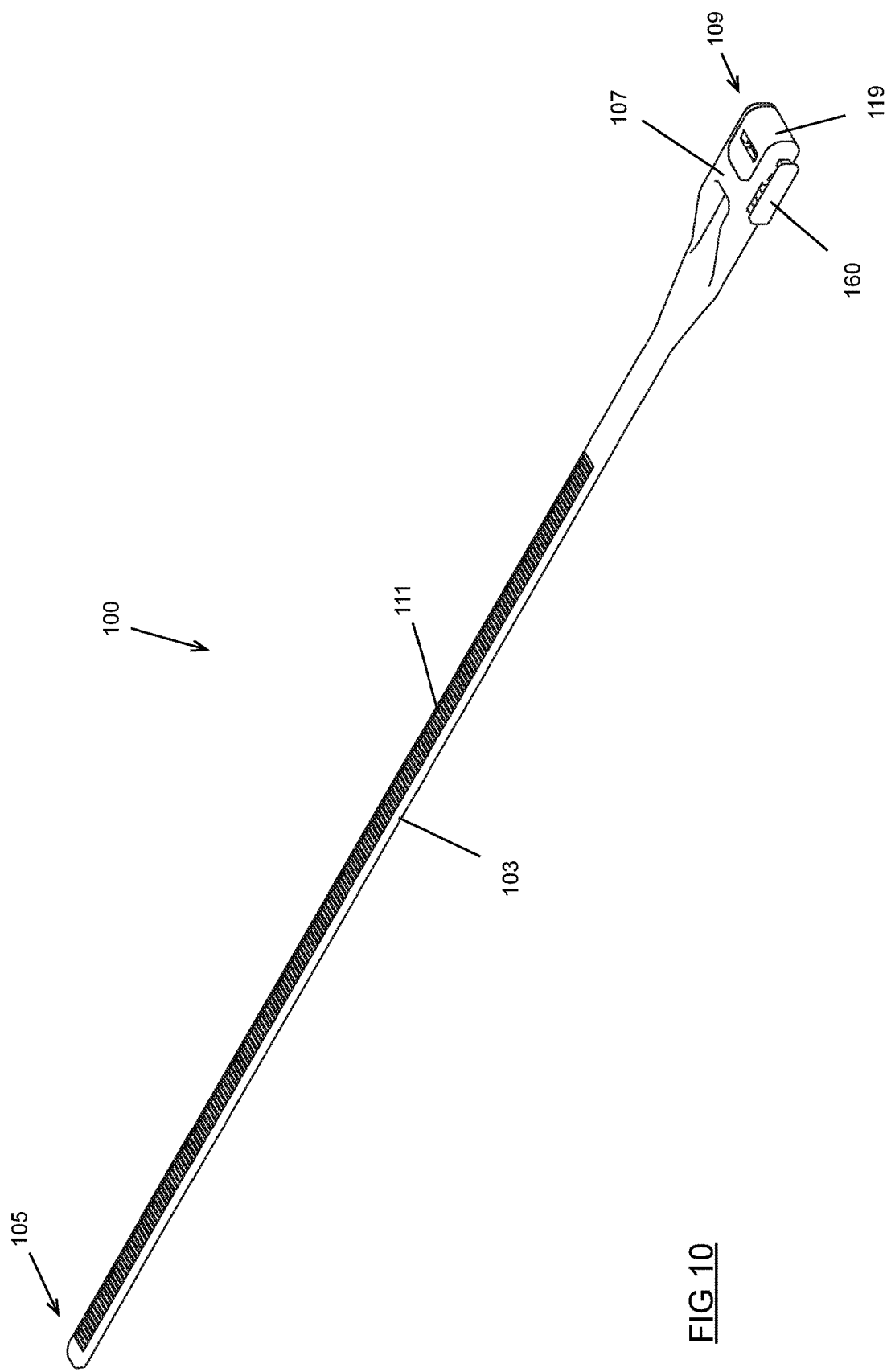
FIG. 10 is a perspective view of a device according to a second aspect of the present invention.

FIG. 15 a top view of the device of FIG. 10;

FIG. 16 is a sectional view taken along the line B-B of FIG. 15;

FIG. 17 is an exploded view of the device of FIG. 10.

The orientations top, side, above, below etc. are taken from arbitrary data and are intended solely to simplify the description below.

FIGS. 1A and 1B show side and top views of a key-releasable securing device 1. The device 1 has a flexible strap 3 having a free end 5 and a locking head 7 at the end 9 of the strap 3 opposite the free end 5.

The locking head has strap openings 12,13 to allow the strap 3 to be inserted into and through the locking head 7. Each strap slot 12,13 joins a cavity (not shown in FIGS. 1A and 1B) through which the strap 3 will extend when it is inserted into and through the locking head 7 in a manner to be described. The strap slots 12,13 therefore function as entrance and exit openings in the locking head 7.

A plurality of teeth 11 are provided on the surface of the locking strap 3.

Figure 2:
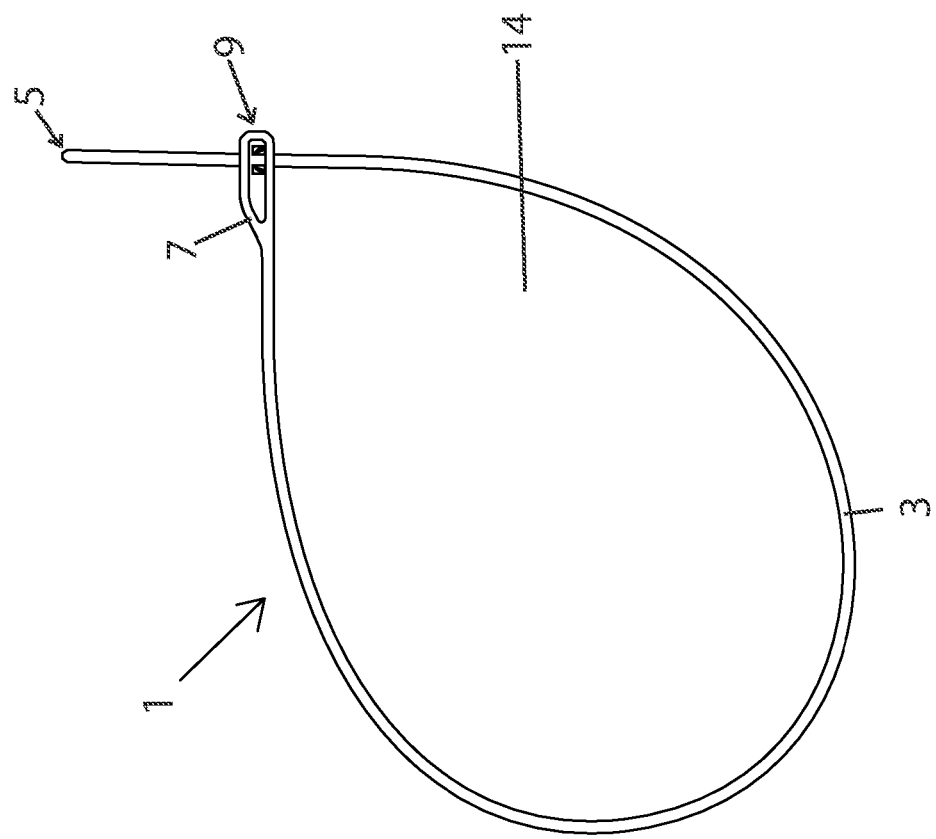
FIG. 2 is a side view of the key-releasable retraining device of FIG. 1A in which the flexible strap is inserted into the locking head to form a closed loop.

FIG. 2 shows the device 1 in a configuration that can be used to bind objects together in a bundle. The free end 5 of the strap 3 has been inserted into and through the locking head 7 to form a closed securing loop 14 of adjustable dimension. It will be readily apparent that movement of the strap 3 in a first direction (upwards and through the locking head 7 in FIG. 2) will reduce the dimension of the loop 14, thereby 'tightening' the device, in particular tightening the device's grip on any object held therein. Continual insertion of the strap 3 into the locking head 7 will diminish the loop size. Movement of the strap 3 in a second direction (downwards and out of the locking head 7) will increase the dimension of the loop 14 thereby loosening the device, in particular loosening the device's grip on any object held therein. These directions may be referred to as 'first' and 'second' directions; or 'tightening' and "loosening' directions, respectively. As will be described later, movement of the strap 3 in the second or loosening direction is prevented by engagement between the strap 3 and the locking head 7.

In use, the user pulls the free end 5 of the strap 3 around an article (not shown) and then inserts the free end 5 through the locking head 7 to form the closed securing loop 14 within which the article is located. Movement of the strap 3 in the tightening direction decreases the dimension of the loop 14 causing the loop 14 to tighten around the article thereby securing it therein. When the loop 14 has been 'maximally tightened' in which the dimensions of the article secured within the loop 14 prevent further tightening, the interior dimension of the loop 14 is substantially equal to the exterior dimension of the article secured therein (since otherwise further tightening would be possible).

Figure 3A:
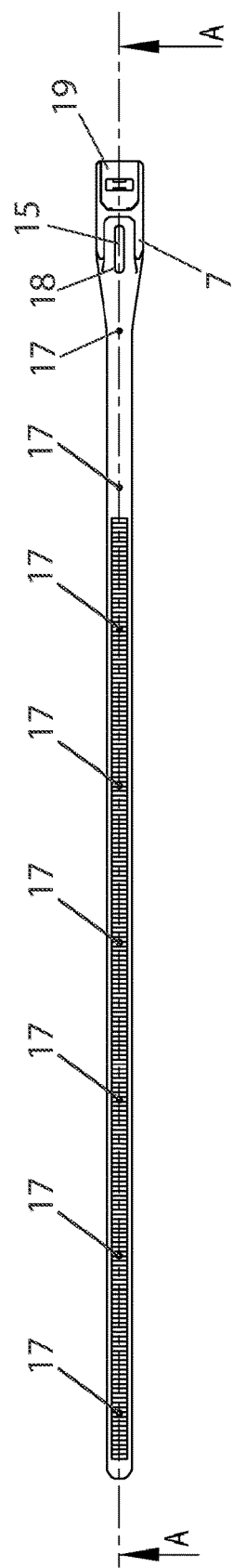
FIG. 3A is a top view of the device of FIG. 1A.

FIG. 3A shows the top of the device 1. The locking head 7 is formed integrally with the strap 3. In this way the locking head 7 is an enlarged extension of the end 9 of the strap opposite the free end 5. The strap 3 tapers outward to the locking head 7 at the end 9 of the strap. A plurality of holes 17 are provided through the strap 3 and an elongated opening 18 is provided in the strap 3 after the strap tapers outward to form the locking head 7.

Figure 3B:
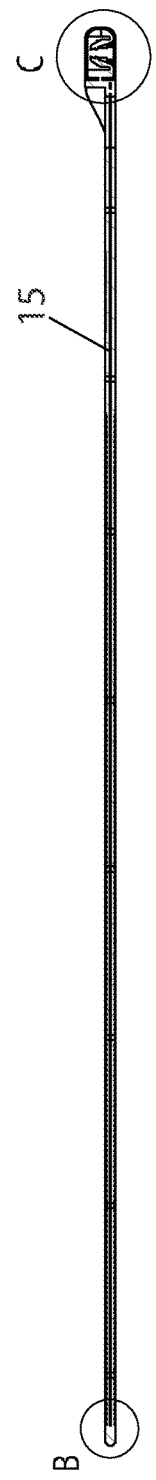
FIG. 3B is a sectional view taken along the line A-A of FIG. 3A.

FIG. 3B shows a cross-section of the device 1 taken along the line A-A of FIG. 3A. Reinforcement 15 is provided within the strap 3 and extends through the strap 3. Substantially all of the strap 3 surrounds the reinforcement 15. Openings 17 extend through the strap 3 (and through reinforcement 15 therein), however elongated opening 18 extends through a top portion of the strap 3 only, and not reinforcement 15. Reinforcement 15 is therefore visible through elongated opening 18.

It will be readily seen from FIGS. 3A and 3B that the strap 3 not only tapers outwardly to form the locking head 7 but also tapers upward (FIG. 3B). To reduce any ease of tampering a cap 19 is provided on the locking head 7. In order for the strap 3 to be inserted through the locking head 7, strap slots are also provided in the cap 19, and the cap 19 has an internal cavity through which the strap 3 extends. The strap slots in the cap 19 are provided either side of the cap 19 and align with the strap slots 12,13 of the locking head 7. The strap 3 is therefore inserted into and through lower strap slot of the locking head 7, through lower strap clot of the cap 19, into and through the cavities of the locking head 7 and cap 19, exiting the locking head 7 through upper strap slot and upper strap slot of the cap 19.

The cap thus provides extra security since anyone wanting to tamper with any mechanism internal to the locking head must penetrate or remove the cap.

Figure 4B:
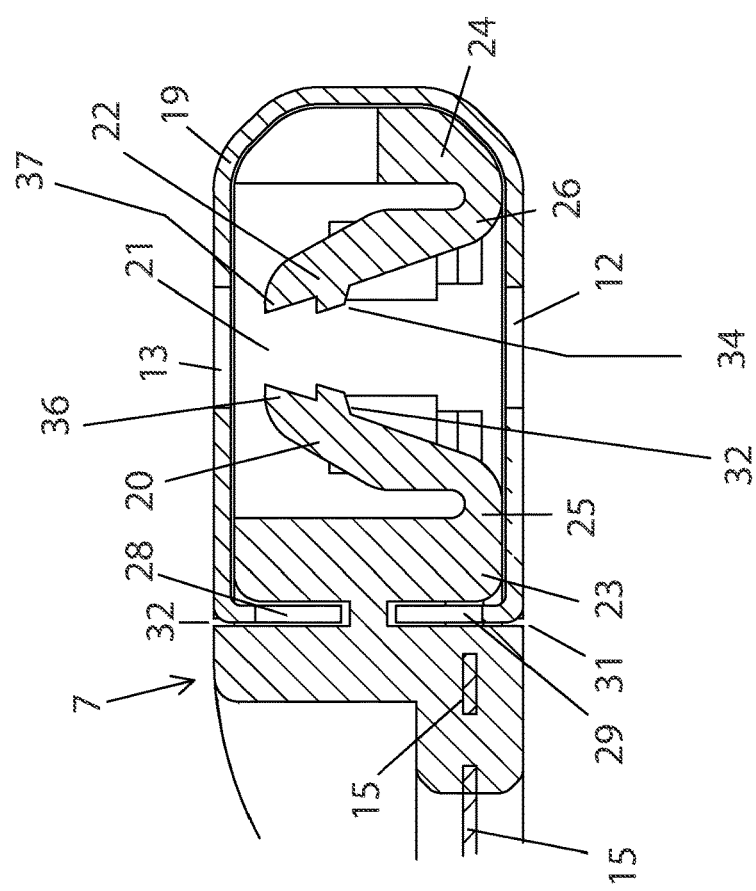
FIG. 4B is a side view of area C of FIG. 3B.
Figure 4A:
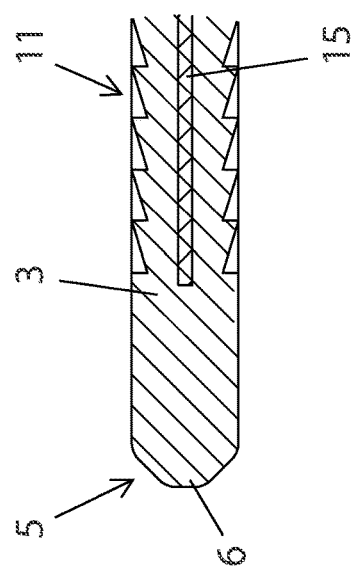
FIG. 4A is a side view of area B of FIG. 3B.

FIG. 4A shows an enlargement of area B of FIG. 3B, which shows the free end 5 of strap 3. The free end 5 tapers to form a flat end 6. The taper assists insertion of the free end 5 of the strap 3 into the locking head 7. It may be seen that the plurality of teeth 11 is a continuous pattern of serrations in the strap 3. A plurality of teeth 11 is provided in both sides of the strap 3, and each plurality of teeth are a substantially identical pattern. In this way, the strap 3 is symmetrical about its longitudinal axis. Notably the maximal dimension of the teeth 11 does not exceed the width of the strap 3, and the distance from 'tooth-point' to 'tooth-point' of two opposing teeth on either side of the strap is substantially the thickness of the strap 3.

FIG. 4B shows an enlargement of area C of FIG. 3B which shows a section of the locking head 7. The locking head 7 is in the form of a housing defined having an interior. Inside the locking head 7 are two pawl members 20,22. The pawl members 20,22 are formed integral two side walls 23,24 of the locking head, and extending outwardly from the two side walls 23,24 of the locking head 7 at two points of flexure 25,26. In this way each pawl member 20,22 is an extension of the side wall 23,24 of the locking head 7 at the point of flexure 25,26.

As will be described in further detail, the points of flexure 25,26 allow the pawl members 20,22 to move such that the pawl members 20,22 can disengage from the teeth 11 of the strap 3. The points of flexure 25,26 are resilient elastic portions of the pawl member 20,22 where the pawl members 20,22 join the walls of the locking head 7. The points of flexure 25,26 can accommodate movement of the pawl members 20,22 in response to a force exerted against the pawl members 20,22 by a release key. The movement accommodated by the points of flexure 25,26 may be bending, pivotable or linear movement etc. and allows the pawl members 20,22 to disengage from the teeth 11.

The points of flexure 25,26 also elastically bias the pawl members 20,22 into engagement with the teeth 11 of the strap.

It may be seen from FIG. 4B that the cap 19 is substantially 'C' shaped, but two inwardly projecting limbs 28,29 that engage with complementarily shaped recesses 30,31 in the locking head 7 so that the cap 19 can snap fit around the housing of the locking head 7.

The pawl members 20,22 include locking tabs 32,34 in the form of protrusions extending outwardly from each pawl and into the cavity of the locking head 7. The pawl members 20,22 also terminate at two pointed portions 36,37.

The pawl members 20,22 extend into the cavity so that the locking tabs 32,34 and pointed portions 36,37 will engage with spaces between the teeth of the flexible strap when the flexible strap is inserted into the cavity. As will be described later, engagement between the locking tabs 32,34 and pointed portions 36,37 of the pawl member and the teeth permits movement of the strap in the first, tightening, direction but prevents movement of the strap in the second, loosening, direction.

As shown in FIG. 4B, the reinforcement 15 is not continuous, but provided in pieces, where part of the reinforcement 15 terminates before the locking head 7, and part of the reinforcement 15 is provided in a side wall of the locking head 7.

Figure 5:
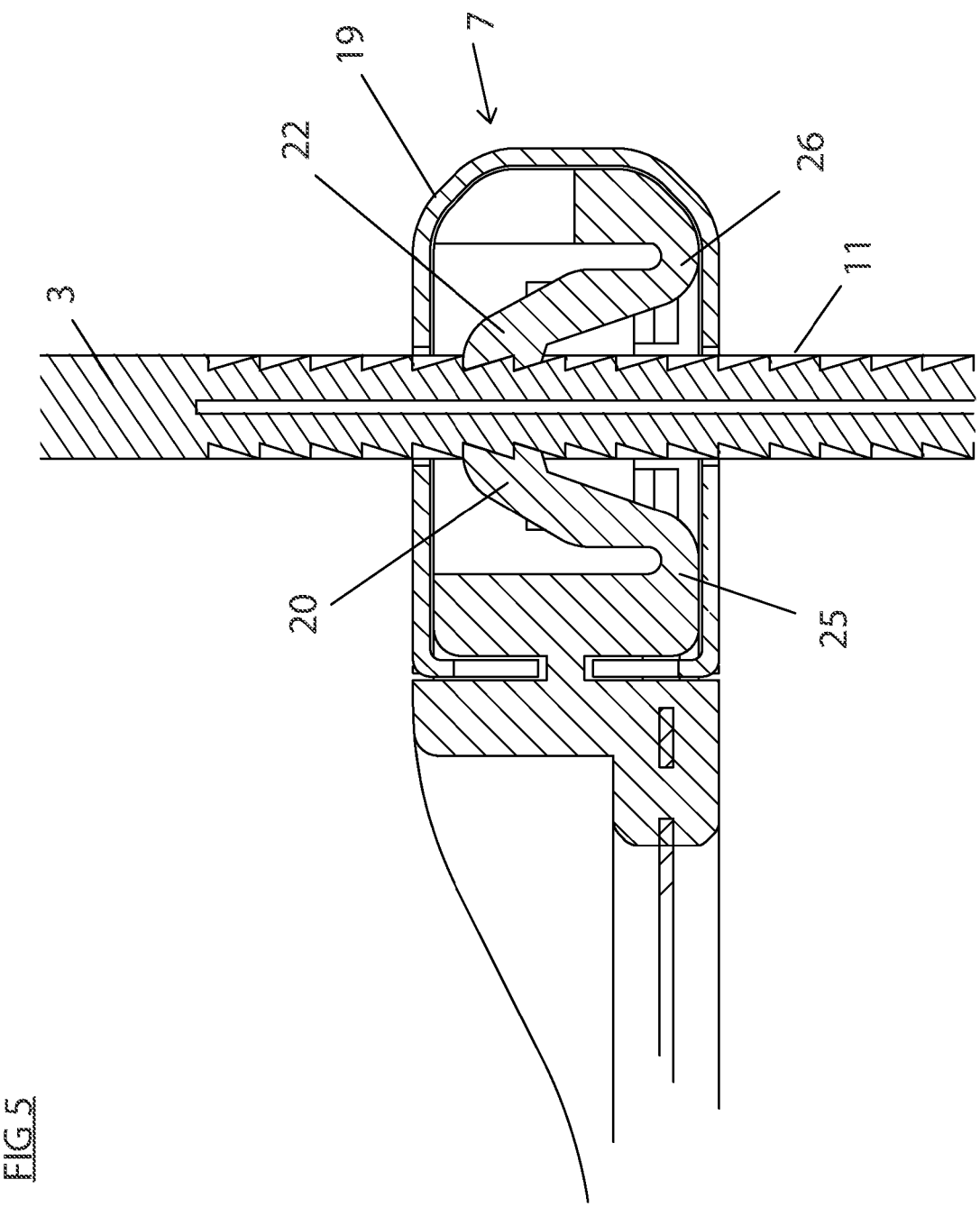
FIG. 5 is a side view of a the locking head of FIG. 2 in receipt of the flexible strap thereby forming a closed loop.

FIG. 5 shows a side view of the device 1 when the strap 3 is inserted into and through the locking head 7. In order to form closed loop 14, the free end 5 of the strap 3 is inserted into strap slot 12, through the cavity 21 on the interior of the locking head 7 and out of the locking head 7 via strap slot 13. The strap 3 is pulled through the locking head 7 in order to tighten the loop 14.

When the strap 3 is inside the locking head 7, the pointed portions 36,37 and the locking tabs 32,34 of the pawl members 20,22 are sized and shaped so as to fit the spaces between the teeth 11 of the strap 3. In this way, the space between the pawl members and the toothed portion of the strap 3 are complementarily shaped. Shown in FIG. 5 the teeth form a dovetail and the space between the pawl members is a dovetail-shaped opening for receipt of the strap. In this way, each pawl member engages two teeth. More specifically, each pawl members have features sized and spaced approximately the same as the teeth; such that each pawl can engage two teeth at once. According to FIG. 5 these features are the pointed portions 36,37 and locking tabs 32,34 which are received in the spaces between the teeth 11, thereby engaging the teeth 11 of the strap 3.

However, it will be readily appreciated that the pawl members may be themselves sized and shaped; or contain features that are sized and shaped so that the pawl members can engage any number of teeth at once.

It will readily be appreciated that, due to the shape of the teeth and pawl members, when the strap 3 is pulled through the locking head 7 in the first, tightening, direction to diminish the loop size, the pawl members 20,22 simply ratchet through the teeth 11. Specifically, referring to FIG. 5, upward movement of the strap 3 will cause the teeth 11 to exert a force against the pawl members 20,22 to urge the pawl members outward about the points of flexure 25,26. The pawl members 20,22 flex away from the strap, and therefore the teeth 11 at the points 25,26. In this way the pawl members 20,22 effectively bend away from the strap 3 enough so that the strap 3 can be pulled further through the locking head 7. This process is somewhat discontinuous as the teeth move past the pawl one at a time (a pair at a time past both pawl members).

If one attempts to pull the strap 3 out of the locking head (in the second, loosening direction) then the teeth 11 of the strap 3 jam against the pointed portions 36,37 and locking tabs 32,34 of the pawl members 20,22. This jamming prevents withdrawal of the strap 3.

Figure 6:
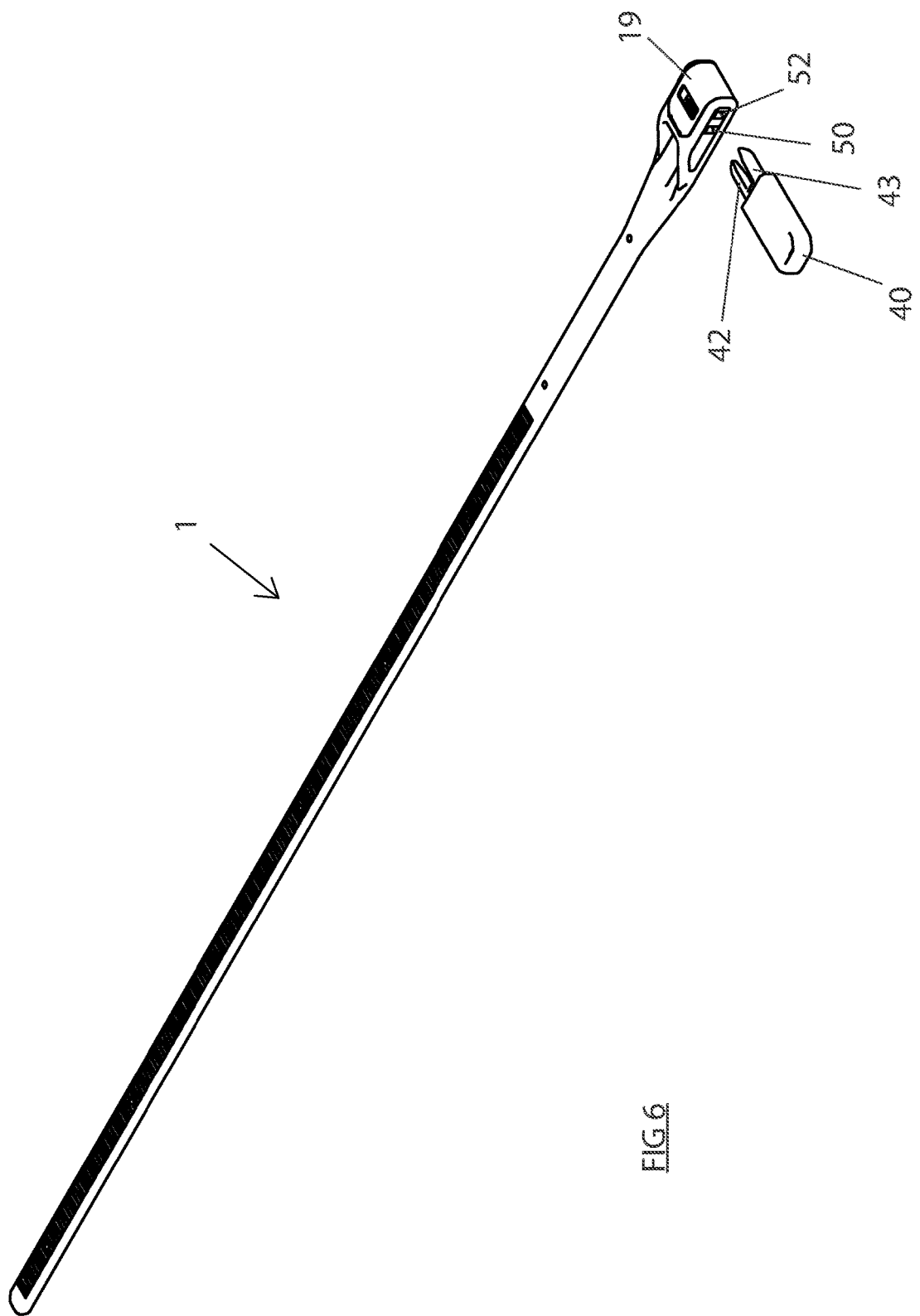
FIG. 6 is a perspective view of the device of FIG. 1A with a release key.

FIG. 6 shows the device 1, and a release key 40. The locking head 7 has guide means in the form of openings 50,52 in the side wall of the locking head 7. The release key 40 has two prongs 42,43 which taper to a point (in both a vertical and horizontal direction).

The openings 50,52 are dimensioned to receive the prongs 42,43 of the release key 40, and the tapering on the prongs 42,43 facilitates ease of insertion into the openings 50,52.

Figure 8B:
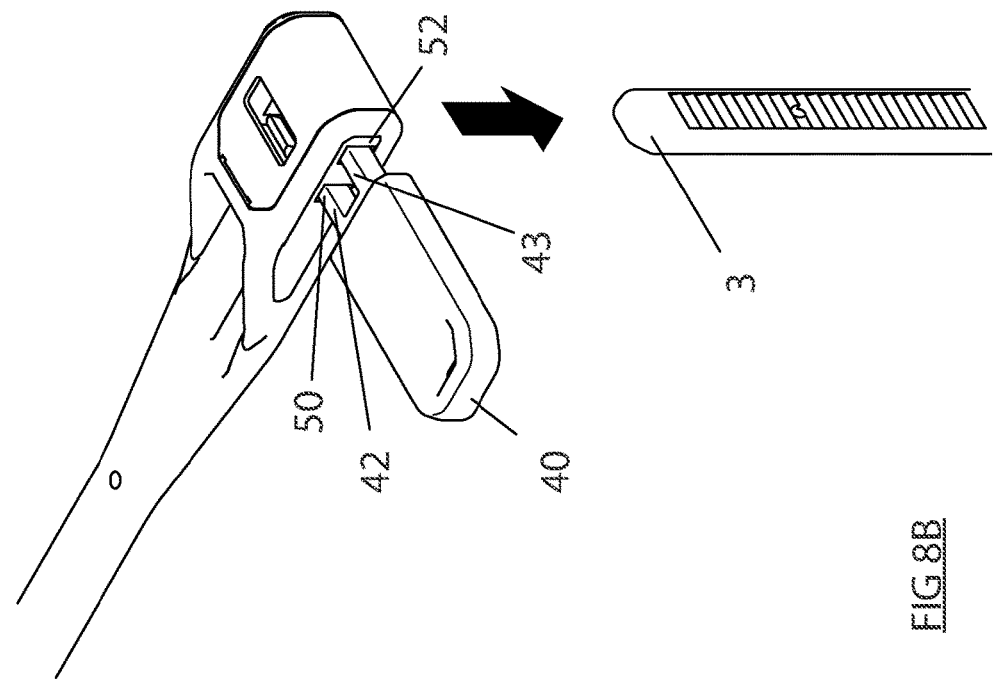
FIGS. 8A and 8B are a perspective views of the device of FIG. 6 in which the release key is inserted into the locking head to thereby release the flexible strap from the locking head.
Figure 8A:
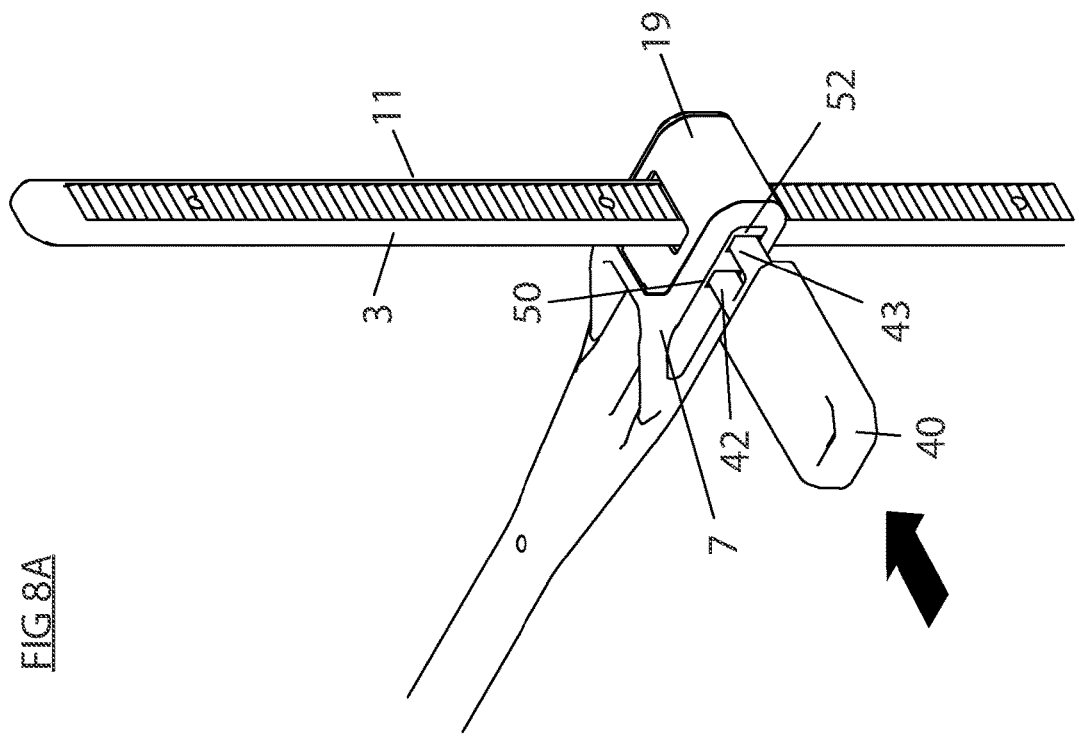

Referring to FIGS. 7A and 7B, the release key 40 is insertable into the locking head 7 via the openings 50,52. As will be described in further detail, the guide means (openings 50,52) guide the prongs 42,43 of the release key into engagement with the pawl members 20,22 such that insertion of the release key 40 into the locking head 7 when the locking head 7 is in receipt of strap 3 will cause the pawl members 20,22 to move out of engagement with the teeth 11 of the strap 3 and thereby allow the strap 3 to be withdrawn from the locking head 7. This is shown in FIGS. 8A and 8B.

The tapering on the prongs is both vertical (which will urge the pawl members in an upward direction as the release key is inserted into the locking head 7) and horizontal (which will urge the pawl members sideways). In this way, insertion of the release key 40 into the locking head 7 will urge the members upward and outward, thereby urging the pawl members out of engagement, via a camming action, with the teeth 11 of the strap 3.

The openings 50,52 provide in the locking head 7 are of shape/size/dimension etc. such that progressive insertion of the release key 40 into the locking head 7 moves the pawl members 20,22 out of engagement with the teeth 11 of the strap 3. The openings 50,52 are positioned in front of the pawl members 20,22 in an alignment such that the prongs 42,43 are guided into engagement with the pawl members 20,22 as the release key 40 is inserted into the locking head 7. As the prongs 42,43 are guided into engagement with the pawl members 20,22, the pawl members 20,22 are urged away from and out of engagement with the teeth 11 of the strap 3. This urging is accommodated by the points of flexure 25,26 about which the pawl members 20,22 bend/flex from. The guide means, release key and locking head are designed such that insertion of the key necessarily causes the pawl members to move out of engagement with the strap. Once the pawl members 20,22 are disengaged with the teeth 11 of the strap 3 the strap 3 is free to be withdrawn from the locking head 7. Thus, the device can be released from its locked, or securing, position and is able to be adjusted or reused any number of times.

It will be appreciated that the dimensions of the key and locking head are complementarily designed for the above purpose. For example, the distance between the prongs 42,43 of the key 40 is substantially identical to the space between the openings 50,52 of the locking head 7.

Figure 9:
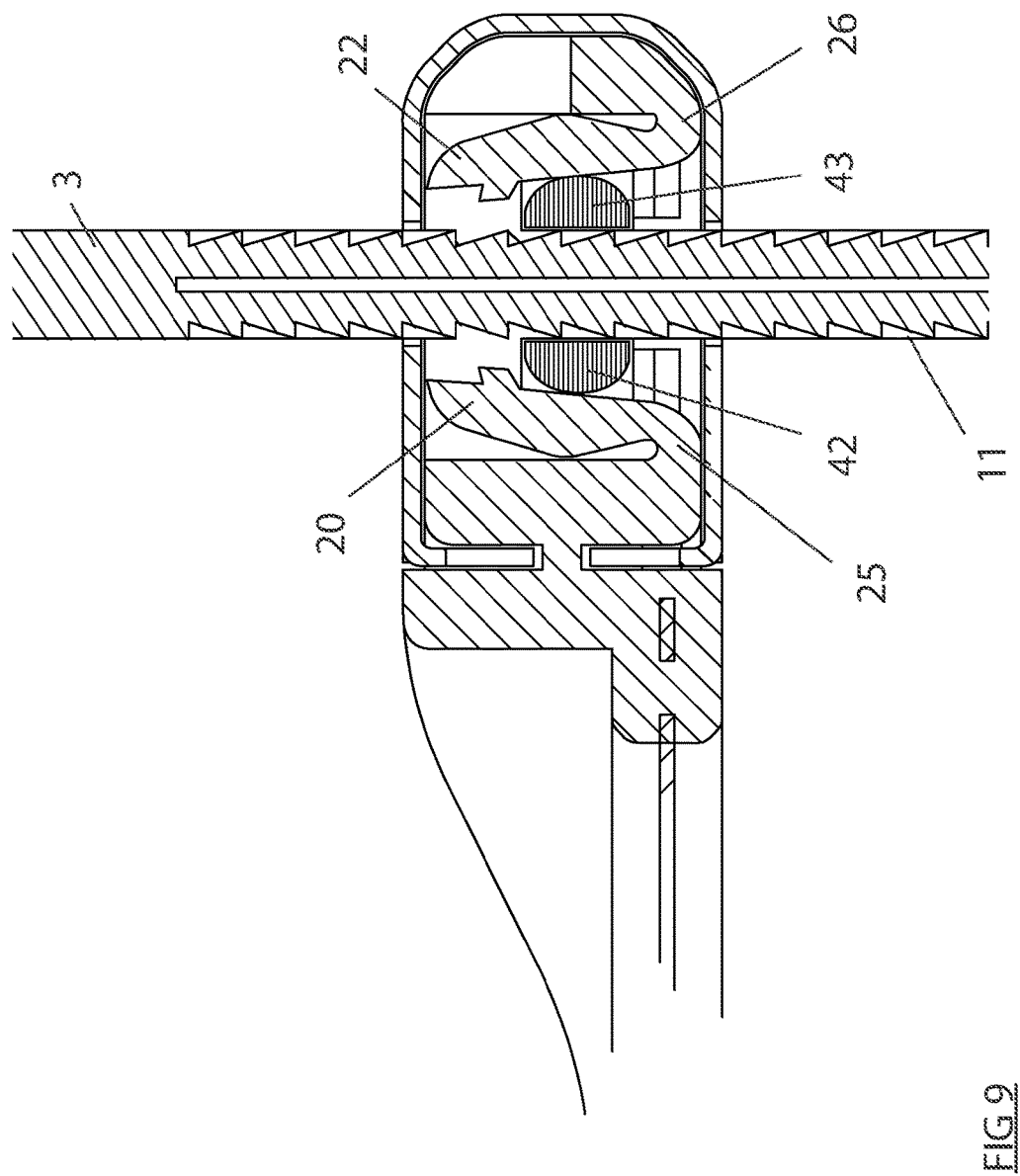
FIG. 9 is a cross-sectional view of the device of FIG. 6 when the release key has been inserted into the locking head in order to release the flexible strap from the locking head.

FIG. 9 shows a cross section through the locking head 7, in receipt of the strap 3, when the release key 40 is inserted into the locking head 7 to release the strap 3, thereby allowing withdrawal of the strap 3 and unlocking of the device. The prongs 42,43 are engaging the pawl members 20,22 and are applying a camming force to the pawl members 20,22. This camming force has urged the pawl members 20,22 out of engagement with the teeth 11 of the strap 3; specifically the pointed portions 36,37 and the locking tabs 32,34 of the pawl members are no longer in engagement with the teeth 11. There is therefore no longer a restriction on withdrawing the strap 3 through the locking head 7.

It will be appreciated that the points of flexure 25,26 allow the pawl members 20,22 to bend out of the way of the strap 3. It will be readily appreciated that the points of flexure 25,26 acts as points about which the pawl members 20,22 bend or flex away from the strap in response to the camming force exerted by the prongs 42,43 of the key 40. It should also be readily appreciated that the points of flexure 25,26 may be provided to allow for any kind of movement necessary to disengage the pawl members 20,22 with the teeth 11. For example, the points of flexure could allow for bending, flexing, pivotable movement, linear movement, even distortion of the pawl members themselves. For example, the key may not have a taper but may push the pawl members outward and away from the strap to disengage the pawl members with the teeth.

When inserted into the locking head 7, the two prongs 42,43 of the key 40 are located on either side of the strap 3 (and either side of the teeth 11). In this way, the prongs 42,43 are located in between the strap and a pawl member 42, 43.

It will also be appreciated that the guide means prevents rotation of the key 40 within the locking head 7. For example, the prongs 42,43 inserted into the openings 50,52 of the locking head 7 are not permitted to rotate within the locking head 7. Rather, the linear motion of the key 40 into the locking head 7 causes the pawl members and teeth to disengage (as described above). Put alternatively, the camming action is in a direction perpendicular to the direction of insertion of the key. This differs from the prior art which requires rotational motion in order to disengage the pawl from the teeth. According to the present invention, insertion alone of the key releases the locking mechanism of the device.

It will also be appreciated that the camming force exerted by the key 40 needs to be sufficient to at least partially overcome any bias of the pawl members into engagement with the teeth, in order to disengage them.

Referring again to FIG. 9, the cross section of the holes 50,52 in the locking head are substantially identical to the cross section of the prongs 42,43 of the key 40. In this way, any movement other than linear, axial, movement into the locking head is prevented.

FIG. 10 shows an alternative embodiment of the device 100. As with the embodiment depicted in FIGS. 1-9 device 100 has a flexible strap 103 having a free end 105 and a locking head 107 at the end 109 of the strap 103 opposite the free end 105. The strap 103 comprises a plurality of teeth 111 on both sides of the surface of the strap.

Although not depicted in FIG. 10 it will be apparent to the skilled person that the flexible strap 103 can be inserted into and through the locking head to form a closed loop of adjustable dimension (as is depicted in FIG. 2 with reference to the device 1). The device 100 can be placed in a configuration that can be used to bind objects together in a bundle by inserting the free end 105 of the strap 103 into and through the locking head 107 to form the closed loop of adjustable dimension that can be closed around the objects that it is desired to secure. In this configuration movement of the strap 103 in a first direction will reduce the dimension of the loop and will thereby 'tighten' the device, in particular tightening the devices grip on any object held therein. Continual insertion of the strap 103 into the locking head 107 will diminish the loop size. Movement of the strap 103 in a second direction (opposite to the first direction) will increase the dimension of the loop size and thereby 'loosen' the device, in particular loosening the devices grip on any objet held therein. As for device 1, movement of the strap 103 in the second direction (the direction that will increase the dimension of the loop size to thereby loosen the device) is prevented by engagement between the strap 103 and the locking head 107.

Additionally, and as for device 1 depicted in FIGS. 1-9, in use, the user pulls the free end 105 of the strap 103 around an article and then inserts the free end 105 through the locking head 107 to form a closed securing loop within which the article is located. Movement of the strap 103 in the tightening direction decreases the dimension of the loop causing the loop to tighten around the article thereby securing it therein. When the loop has been 'maximally tightened' in which the dimensions of the article secured within the loop prevent further tightening, the interior dimension of the loop is substantially equal to the exterior dimension of the article secured therein (since otherwise further tightening would be possible).

The locking head 107 is formed integrally with the strap 103 and is an enlarged extension of the end 109 of the strap 103 opposite the free end 105. The strap 103 tapers outward to the locking head 107 at the end 109 of the strap.

To reduce any ease of tampering, a cap 119 is provided on the locking head 107. Strap slots are provided in the cap 119 that align with strap slots of the locking head 7 enabling the strap 3 to be inserted into and through the cap 119 and the locking head 107. Cap 119 therefore provides extra security since anyone wanting to tamper with any mechanism internal to the locking head must penetrate or remove the cap.

In order to release the strap 3, when it has been inserted into and through the locking head 107 to form a closed loop of adjustable dimension; the locking head 107 has guide means in the form of openings 150,152 in the side wall of the locking head 107. These openings are best seen with reference to FIG. 17.

Button 160 is provided partially, but not fully, inserted into the locking head 107. Button 160 comprises a release mechanism in the form of two prongs (that will be described with reference to a later figure) and a spring section comprising a spring that biases the button 160 out of full engagement with the locking head 107. It will later be apparent that full engagement of the button 160 with the locking head 107 (corresponding to maximal insertion of the button 160 into the locking head 107) will move two pawl members (not shown in FIG. 10) of the locking head 107 out of engagement with teeth 111 of the strap 103 to thereby facilitate removal of the strap 103 through the locking head 107. As teeth 111 are provided on both sides of the strap 103 it will be understood that two pawl members 120, 122 are provided such that each pawl members engages the set of teeth on one side of the strap 103. In this way, an improved securement is obtained.

The guide means (openings 150, 152) guide the prongs 162, 164 of the button 160 into engagement with the pawl members 120, 122 such that applying a force to the button 160 will move it further into the locking head 107. When the locking head 107 is in receipt of strap 103 this will cause the pawl members 120, 122 to move out of engagement with the teeth 111 of the strap 103 and thereby allow the strap 103 to be withdrawn from the locking head 107.

Figure 12B:
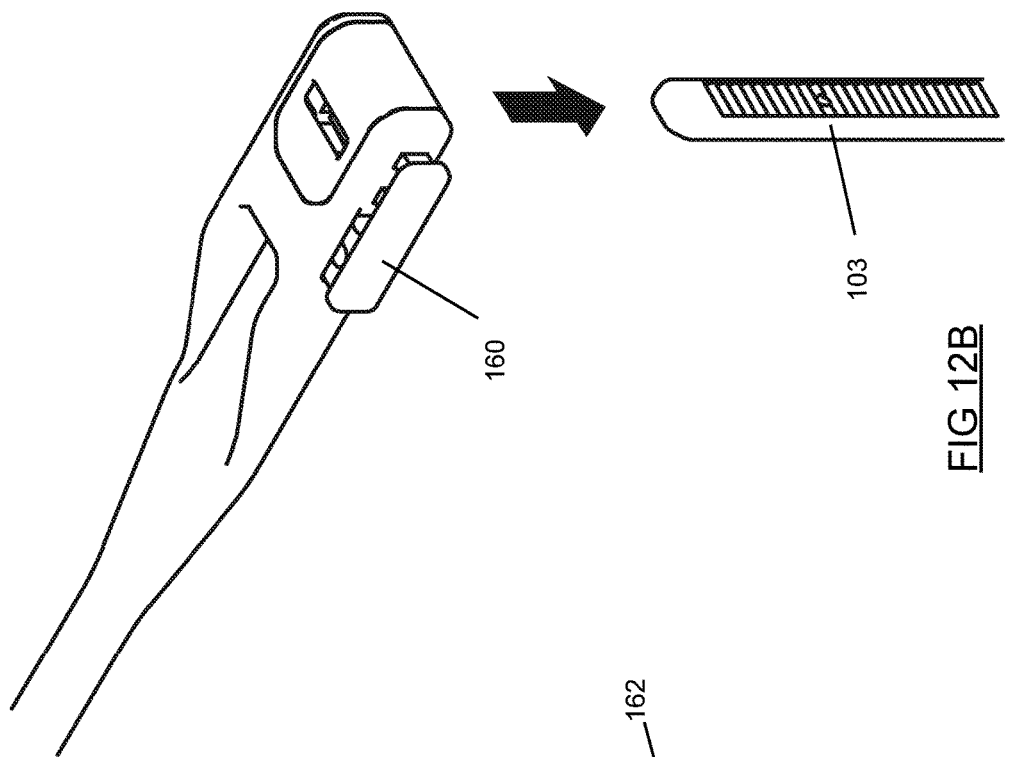
FIGS. 12A and 12B are a perspective views of the device of FIG. 10 in which the guide means are urged further into the locking head to thereby release the flexible strap from the locking head.
Figure 12A:
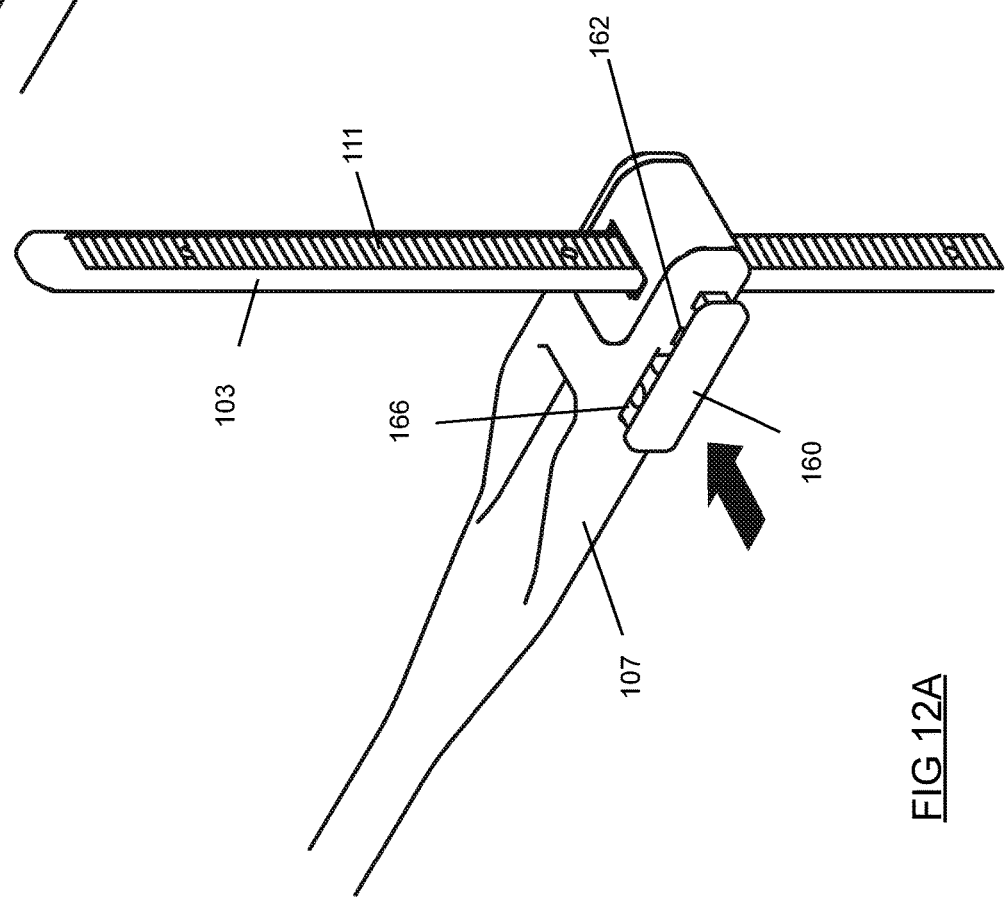

This is depicted in FIGS. 12A and 12B. FIG. 12A shows that movement of button 160 in a direction toward the locking head 107 (movement in this direction will act against the spring bias and will cause prongs of the button 160 to urge pawls of the locking head 107 out of engagement with the teeth 111 of the strap 103, and the strap 103 can then be removed (FIG. 12B).

As shown in FIG. 17, the locking head 107 has two pawl members 120, 122 that extend from the locking head 107.

The pawl members may extend from any interior surface of the locking head (e.g. a top surface, bottom surface, side walls etc.).

The pawl members 120, 122 engage the teeth 111 of the strap 3 to prevent movement in one direction. The pawl members extend outwardly at two points of flexure, and are thus formed as extensions of the interior side walls of the locking head 107 at the points of flexure. The points of flexure allow the pawl members to move such that the pawl members disengage from the teeth 111 of the strap 103.

Figure 14:
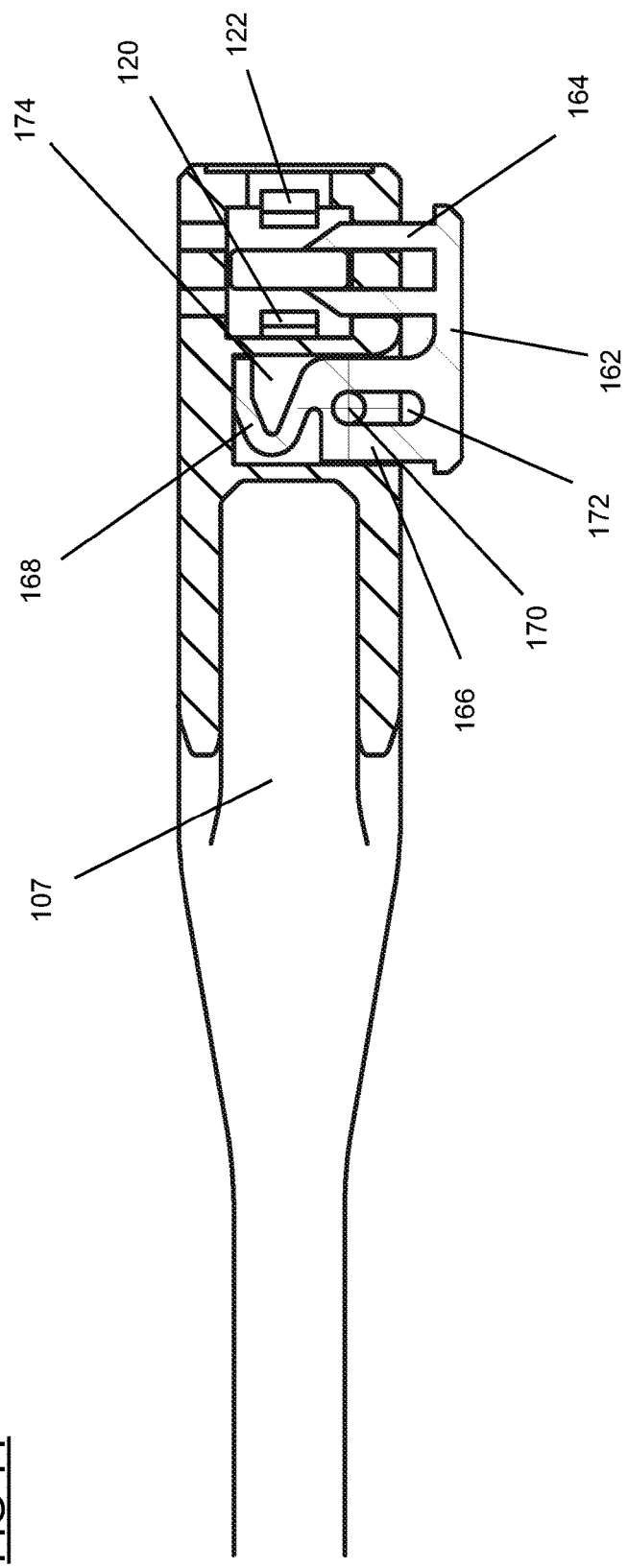
FIG. 14 is a sectional view taken along the line A-A of FIG. 13.
Figure 13:
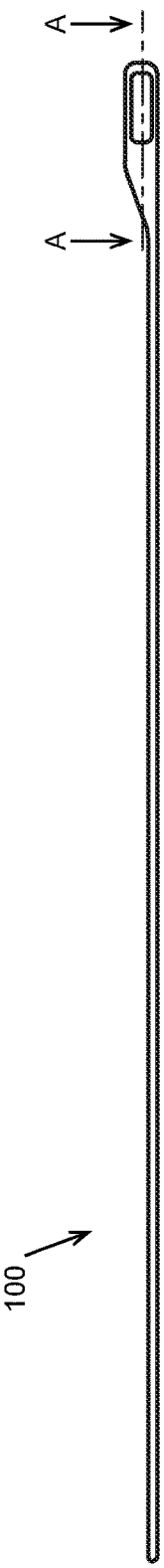
FIG. 13 is a side view of the device of FIG. 10.

FIGS. 14 and 16 show cross sections through the locking head 107. Strap 103 has not been inserted into and through the locking head 107 and therefore the device can be regarded as 'unlocked'. The purpose of FIG. 14 is to show the release mechanism of the strap 103 when the strap 103 is inserted into and through the locking head 107.

Button 160 comprises spring section 166, spring section 166 comprising spring 168 that biases the button 160 out of locking head 107. Button 160 is held in the locking head 107 via engagement between a channel 172 of the button 160 and a pin 170 of the locking head 107. It will be readily apparent that the pin 170 will move through the channel 172 when the button is pressed/depressed or otherwise moved toward the locking head 107. A cavity 174 is provided in the locking head 107 for receipt of the spring section 166 of the button 160. Button 160 has prongs 162, 164 that each have both a vertical (not shown) and a horizontal (shown) taper. The middle section of the pawl members 120, 122 are shown. Due to the position of the cross section through the locking head the pawl members 120, 122 are shown not protruding not the central cavity of the locking head (where the strap would be) since only part of the 'stems' of the pawl members 120, 122 are shown.

It will readily be appreciated from FIG. 14 that depression of button 160 will act against the bias of the spring 168 and cause the button to move further into locking head 107. Herein, by 'depression of the button 160' it is meant movement of the button further into the locking head (the direction opposite to the direction that would disengage the button from the locking head). It is envisaged that a gentle pressure applied by a user will be sufficient to move prongs 162, 164 into the locking head 107 sufficiently so that the prongs 162, 164 are 'fully inserted' into the locking head 107. Here, fully inserted means maximal insertion (i.e. when lower portion of channel 172 has engaged the pin 170) and so approximately no more of the prongs 162, 164 can be inserted into the locking head 107. However, it will be understood that progressive movement of the button into the locking head will facilitate engagement between the prongs 162, 164 and the pawl members 120, 122 so as to move the pawl members 120, 122 out of engagement with the teeth 111 of the strap 103.

Depression of button 160 causes prongs 162, 164 to move further into the locking head 107. Although not shown in FIG. 14 it will also be appreciated that depression of button 160 will cause the prongs 162, 164 to move into engagement with the pawl members 120, 122 of the locking head 107. When the locking head 107 is in receipt of strap 130, depression of the button will cause the prongs 162, 164 to move into engagement with the pawl members 120, 122. The prongs 162, 164 of the button moving into engagement with the pawl members 120, 122 will cause the pawl members 120, 122 to move out of engagement with teeth 111 of the strap 103 and thereby allow the strap to be withdrawn from the locking head. This is shown in FIGS. 12A and 12B.

Tapering on the prongs 162, 164 is vertical and horizontal. The vertical tapering will urge the pawl members in an upward direction as the button is depressed and the prongs are urged into contact with the pawl members. The horizontal tapering will urge the pawl members sideways as the button is depressed and the prongs are urged into contact with the pawl members. In this way, pressing the button 160 will urge the pawl members upward and outward, thereby urging the pawl members out of engagement with the teeth 111 of the strap 103, via a camming action. This urging is accommodated by points of flexure about which the pawl members 120, 122 bend/flex. Once the pawl members 120, 122 are disengaged from the teeth 111 of the strap 103, strap 103 is free to be withdrawn from the locking head. Thus, the device can be released from its locked, or securing, position and is able to be adjusted or reused any number of times.

Due to the taper, progressive insertion of the button/prongs into the locking head 107 moves the pawl members 120, 122 progressively out of engagement with the teeth 111 of the strap 103.

FIG. 16 shows how pawl members 120, 122 are naturally resiliently biased into a central channel of the locking head 107 (through which the strap 103 extends when it is inserted into and through the locking head). It will therefore be appreciated that these dimensions promote engagement between the pawl members 120, 122 and the teeth 111 of the strap 103 when the locking head 107 is in receipt of the strap.

FIG. 16 shows how the pawl members 120, 122 will flex away from the central channel of the locking head (against their natural bias) due to a camming action applied from the prongs 162, 164 when the button 160 is depressed. This camming force will urge the pawl members 120, 122 upward and outward from the central channel and hence out of engagement with the teeth 111 of the strap. Points of flexure of the pawl members 120, 122 (the point at which they are attached to the interior surfaces of the locking head) allow the pawl members 120, 122 to bend out of the way of the strap. The points of flexure act as points about which the pawl members 120, 122 can bend or flex away or pivot from etc. in response to the camming force exerted by the prongs 162, 163 of the button 160 when the button 160 is pushed into the locking head 107. The points of flexure may be provided to allow any kind of movement necessary to disengage the pawl members 120, 122 with the teeth 111 (e.g. bending, flexing, linear, rotational movement, pivotable movement etc. or even distortion of the pawl members themselves).

Referring again to device 1, the key may be attached to the device. For example, the key may be provided as an integral part of the locking head or may otherwise be secured or attached (e.g. via a cord). Locking means may be provided to prevent actuation of the key. In other words, a locking means may lock the device in the secured position. In this way, the device is secured in a loop that may be released by a key or button but a locking means prevents movement of the key/button to release the strap from the locking head. If the key is integral to the locking head, i.e. it may be integrally formed with the locking head or otherwise all or partially inserted into the locking head, then a locking means will prevent the device's release since it will prevent the movement of the key that facilitates the release. The key may be partially inserted into the locking head, or held in a partially inserted position. The locking means may be a combination lock provided in the locking head. In this case the 'unlock' combination facilitates movement of a barrel out of engagement with the spring section of the button. When locked, the barrel can be engaged with the spring section thereby preventing depression of the button (thereby preventing release and loosening of the strap).

Note that the type of pawl depicted in the first embodiment has a locking tab and/or a pointed portion, whereas the type of pawl depicted in the second embodiment is a more 'straight tab' pawl. It will be understood that this point of difference is not limiting and either type of pawl may be provided in any embodiment. Any pawl that engages the teeth of the strap such that it acts as a ratchet-like mechanism is within the scope of this disclosure.

Although the locking head is depicted as being formed integrally with the strap it will be understood that the locking head could otherwise be provided as a separate component to be attached to the strap. It may, for example, be clipped on to the strap—in which case its position relative to the strap is not predetermined and adjustable.

The entire device may be made of Nylon and may also be manufactured by moulding. In this case, the device may be manufactured in one piece. Alternatively, the locking head may be moulded separately and secured onto the strap thereafter.

Although a plurality of teeth is provided on both sides of the strap it will be understood that a plurality of teeth may only be provided on one side of the strap. In this case, the other side of the strap may be a smooth surface. In this case, only a single pawl member may be necessary in the locking head. When the strap is inserted into the locking head to form the closed loop the smooth surface of the strap may be on either the interior or the exterior side of the loop. In this case, a release key with only a single prong may be used to release the device from its locked position to allow the strap to be withdrawn.

Additionally, the pattern of teeth need not be continuous, and the patterns of teeth on either side of the strap need not be identical. For example, the spacing between the teeth may be larger on one side of the strap than the other (and the corresponding pawl member inside the locking head will be complementarily designed accordingly). The teeth pattern may be made up of groups of teeth, separated by a smooth surface of the strap, which may repeat. The groups of teeth on one side of the strap may be opposite a smooth surface on the other side of the strap, and vice versa, so that, although the teeth pattern is not continuous on either side of the strap, the teeth are continuous on the strap as a whole (considering both sides).

Although the distance between points of opposite teeth is shown as being substantially identical to the width/thickness of the strap (so that the width of the strap is not increased by the provision of the teeth) this need not be the case. The teeth may not extend out of the strap, or may protrude from the strap thereby increasing its width. In this latter case the free end of the strap will have width smaller than the distance from two opposite tooth points, and the pawl members would not engage the strap itself until they engaged the teeth.

Although it is depicted that identical teeth patterns are provided on either side of the strap—in which case the pawl members are substantially identical and so the interior of the locking head is substantially symmetric—this need not be the case. The teeth on one side of the strap could be offset from those of the other, in which case the pawl members would also be offset; or the features provided on the pawl members (the locking tab, for example) would be offset. In this case the interior of the locking head would not be symmetric.

The pawl members may not be formed integrally with the side walls of the locking head. alternatively, they may be separate members connected to the locking head at a hinge or pivot.

The pawl members need not have locking tabs or pointed portions. It will be appreciated that any shape capable of ratchet-like engagement with the teeth—allowing the teeth to ratchet through the locking head when the strap is pulled in the first direction, but prevent of the strap in the second direction due to the engagement with the pawl members and teeth—is contemplated by this disclosure. For example, the entire pawl member could be a rod extending into the spaces between the teeth. The pawl member need not be complementarily designed relative to the teeth and spaces therebetween, provided it can still function as disclosed above.

The reinforcement extending through and within the strap may be entirely enclosed by the strap (in which case the holes 17 will not be necessary). The holes 17 may result from a particular method of manufacturing the device. It will nevertheless be understood that the presence of the holes in the strap is an optional feature. The reinforcement may be of a material harder than the material of all or part of the device. For example, the device may be made from plastic. The reinforcement may be metal, for example a metal strip or rod.

The strap openings may not necessarily be aligned with one another (to form a through-channel). They may instead be misaligned in which case the strap may be forced to take a tortuous path when it extends through the cavity of the locking head.

The reinforcement may terminate at or before the locking head, or the reinforcement may extend into and through the locking head. The reinforcement may extend into and through the locking head and may form all or part of the pawl. For example, the reinforcement may be designed as a strap which curves to form the pawl member at a distal end. In this way, the teeth of the strap with ratchet through the reinforcement itself when the strap is inserted through the locking head.

The reinforcement may be a continuous strip or may piece-wise extend through the strap. All or part of the reinforcement need not necessarily extend within the strap but could be provided on the exterior of the strap.

If the locking head is formed integrally with the strap then the strap need not necessarily taper outward and upwardly to the locking head. The locking head may not be an enlarged extension of the strap, but rather just an extension of the strap. Alternatively the strap may taper outward to the locking head, but not taper sideways, or vice-versa, etc.

The cap on the locking head may be made of a material stronger than the material of the device. For example, the cap may be made of metal. The cap can be any shape, not necessarily substantially C-shaped with two limbs. For example, the cap could have inwardly protruding clips, or protruding dots etc. that would matingly engage with complementarily shaped holes on the locking head to clip the cap in place. Alternatively, the cap may be glued, integrally formed with, or otherwise provided on the locking head.

Although the free end depicted as tapering to form a flat end, the free end could taper to a point.

Although the guide means is depicted as an opening sized to receive the key it will be appreciated that any guide means the release key into engagement with the pawl, so as to move the pawl out of engagement with the teeth of the flexible strap to allow the strap to move in the second direction is contemplated by this disclosure. For example, the guide means could be an arrangement, shape or dimensions of side walls, or interior walls, of the locking head that guide the release key into engagement with the pawl members as above.

Although the key is depicted as having two prongs it will be appreciated that the key may be of any size and shape to move the pawl members out of engagement with the teeth when it is guided by the guide means into engagement with the pawl members as moves further into the locking head.

For example the key may be a single rod for insertion into the locking head. In this case the pawl members may have an interior taper (on the interior wall of the pawl members) so that movement of the key into the locking head, engaging with the interior walls of the pawl members will force the pawls out of engagement with the teeth because of the taper.

Although the key is depicted as having tapered portions, any number of tapers, or no tapers at all may be provided in the alternative.

The opening to receive the key need not be sized exactly to receive a complementary part of the key, since the guide means could be completely internal to the locking head. In this case the opening just needs to be large enough to receive the part of the key that will force the pawl members out of engagement with the teeth.

When the guide means is an opening, the opening will be sized and dimensioned to guide the key into engagement with the teeth of the strap, as described above. The openings may or may not be in alignment with the pawl members to facilitate this engagement.

A cross section of any opening in the locking head may be substantially identical to the cross section of the key. Where the guide means is an opening then this is particular advantageous. Openings may be provided in either side of the locking head.

The pawls may be biased into engagement with the teeth, not necessarily at the points of flexure. The points of flexure may accommodate any necessary movement to disengage the pawl members with the teeth; but any means of biasing the pawl members into engagement with the teeth is contemplated.

Although the release mechanism is exemplified as a prong, the release mechanism may be the button (including a spring and at least one prong), two prongs, two prongs and a spring, etc. The release mechanism may also be a prong separated from the locking head. The release mechanism may be a separate key. This key may comprise a prong.

When the pawls are engaged with the teeth of a strap, the strap being inserted into and through the locking head, this may be referred to as the secured or securing position of the device. The position of the release mechanism and/or the release key when the device is in this position may also be referred to as the 'secure position' (of the release key/release mechanism). Therefore, when the release key/release mechanism is in a 'secure position' or 'securing position', they are not in a position that disengages the pawls from the strap and the device is secured/locked. The position of the release mechanism/release key when the device is 'unlocked' (and the pawl members are urged out of engagement with the strap to facilitate removal thereof) may be referred to as the 'release position' or 'releasing position'. When the release key/release mechanism is in a 'release position' or 'releasing position', they are in a position that disengages the pawls from the strap and the strap may be removed from the locking head.

Herein, by insertion into the locking head it is meant insertion from outside the locking head into the locking head but also further insertion into the locking head (since the key may be provided partially inserted in the locking head; insertion in this case is intended to encompass further movement into the locking head).

In the case of only one side of the strap having teeth, the camming force may be reacted against the side wall of the opening in the locking head, or a side wall on the interior of the locking head. In the case of both sides of the strap having teeth the camming forces (provided either side of the strap) may react against one another; the strap itself may also absorb some of the force, though not an amount sufficient to prevent the pawl members from disengaging the teeth.

The present invention is not limited by the specific embodiments described above. Alternative arrangements and materials will be apparent to a reader skilled in the art.

The invention claimed is:

1. A releasable securing device, comprising:
a flexible strap having a plurality of teeth;
a locking head having a cavity, wherein the flexible strap is insertable into and through the cavity to thereby form a securing loop of adjustable dimension, the flexible strap being slidably movable within the cavity in a first direction to reduce the dimension of the securing loop, and slidably movable within the cavity in a second direction to increase the dimension of the securing loop; and
a pawl member located inside the locking head so as to engage with the teeth of the flexible strap when the flexible strap is inserted into the cavity, wherein engagement between the pawl member and the teeth permits movement of the strap in the first direction but prevents movement of the strap in the second direction;
wherein the locking head comprises guide means arranged such that as a release mechanism is actuated, the release mechanism is guided by the guide means into engagement with the pawl member, so as to move the pawl member out of engagement with the teeth of the flexible strap to allow the strap to move in the second direction, and
wherein the release mechanism comprises at least one prong and the at least one prong comprises a taper for urging the pawl member out of engagement with the teeth of the strap.

2. A releasable securing device according to claim 1, wherein the guide means comprises part of a side wall of the locking head.

3. A releasable securing device according to claim 2, wherein the guide means comprises at least one opening in the locking head for receipt of the release mechanism.

4. A releasable securing device according to claim 2, wherein the release mechanism is provided on a button, and wherein the release mechanism is partially inserted into the locking head.

5. A releasable securing device according to claim 4, wherein the guide means comprises at least one opening in the locking head and the release mechanism comprises at least one prong, and the at least one prong is partially inserted in the at least one opening.

6. A releasable securing device according to claim 4, wherein the button further comprises a spring biasing the button outwardly from the locking head.

7. A releasable securing device according to claim 1, wherein the guide means comprises at least one opening in the locking head for receipt of the release mechanism, wherein the release mechanism comprises at least one prong, and wherein the cross section of the at least one prong is substantially the same as the cross section of the at least one opening.

8. A releasable securing device according to claim 1, wherein the pawl member is resiliently biased into engagement with the strap.

9. A releasable securing device according to claim 1, wherein the pawl member comprises a locking tab for engaging a space between the teeth of the strap.

10. A releasable securing device according to claim 1, wherein the plurality of teeth are provided on both sides of the strap.

11. A releasable securing device according to claim 10, further comprising an additional pawl member, such that the pawl member engages teeth in one side of the strap and the additional pawl member engages teeth in the other side of the strap.

* * * * *